US008178272B2

United States Patent
Rimoto et al.

(10) Patent No.: US 8,178,272 B2
(45) Date of Patent: May 15, 2012

(54) EXTERNAL ADDITIVE, METHOD OF MANUFACTURING SAME AND TONER

(75) Inventors: Masanori Rimoto, Mishima (JP); Masakazu Nakada, Numazu (JP); Hideyuki Ueda, Numazu (JP)

(73) Assignee: Ricoh Company Limited, Tokyo (JP)

( * ) Notice: Subject to any disclaimer, the term of this patent is extended or adjusted under 35 U.S.C. 154(b) by 848 days.

(21) Appl. No.: 12/208,770

(22) Filed: Sep. 11, 2008

(65) Prior Publication Data

US 2009/0068580 A1 Mar. 12, 2009

(30) Foreign Application Priority Data

Sep. 12, 2007 (JP) ................................ 2007-236402

(51) Int. Cl.
*G03G 9/00* (2006.01)
*C01B 15/12* (2006.01)
(52) U.S. Cl. ............. 430/108.6; 430/108.1; 430/108.11; 423/275
(58) Field of Classification Search ............... 430/108.1, 430/108.11, 108.6, 109.4; 423/275
See application file for complete search history.

(56) References Cited

U.S. PATENT DOCUMENTS

| 5,429,902 A * | 7/1995 | Saito et al. ................. 430/108.3 |
| 2005/0003289 A1* | 1/2005 | Fushimi et al. ............. 430/108.3 |

FOREIGN PATENT DOCUMENTS

| EP | 1 482 380 A1 | 12/2004 |
| JP | 56-128956 | 10/1981 |
| JP | 59-52255 | 3/1984 |
| JP | 60-112052 | 6/1985 |
| JP | 2623919 | 4/1997 |
| JP | 2675950 | 7/1997 |
| JP | 3018858 | 1/2000 |
| JP | 3160688 | 2/2001 |
| JP | 3232858 | 9/2001 |
| JP | 3700263 | 7/2005 |
| JP | 3772631 | 2/2006 |
| JP | 4098109 | 3/2008 |

* cited by examiner

*Primary Examiner* — Mark F Huff
*Assistant Examiner* — Stewart Fraser
(74) *Attorney, Agent, or Firm* — Oblon, Spivak, McClelland, Maier & Neustadt, L.L.P.

(57) ABSTRACT

An external additive including titanium dioxide having a water-soluble component of at least 0.2% by weight and a fluorosilane compound, wherein the titanium dioxide is surface-reformed by the fluorosilane compound.

16 Claims, 1 Drawing Sheet

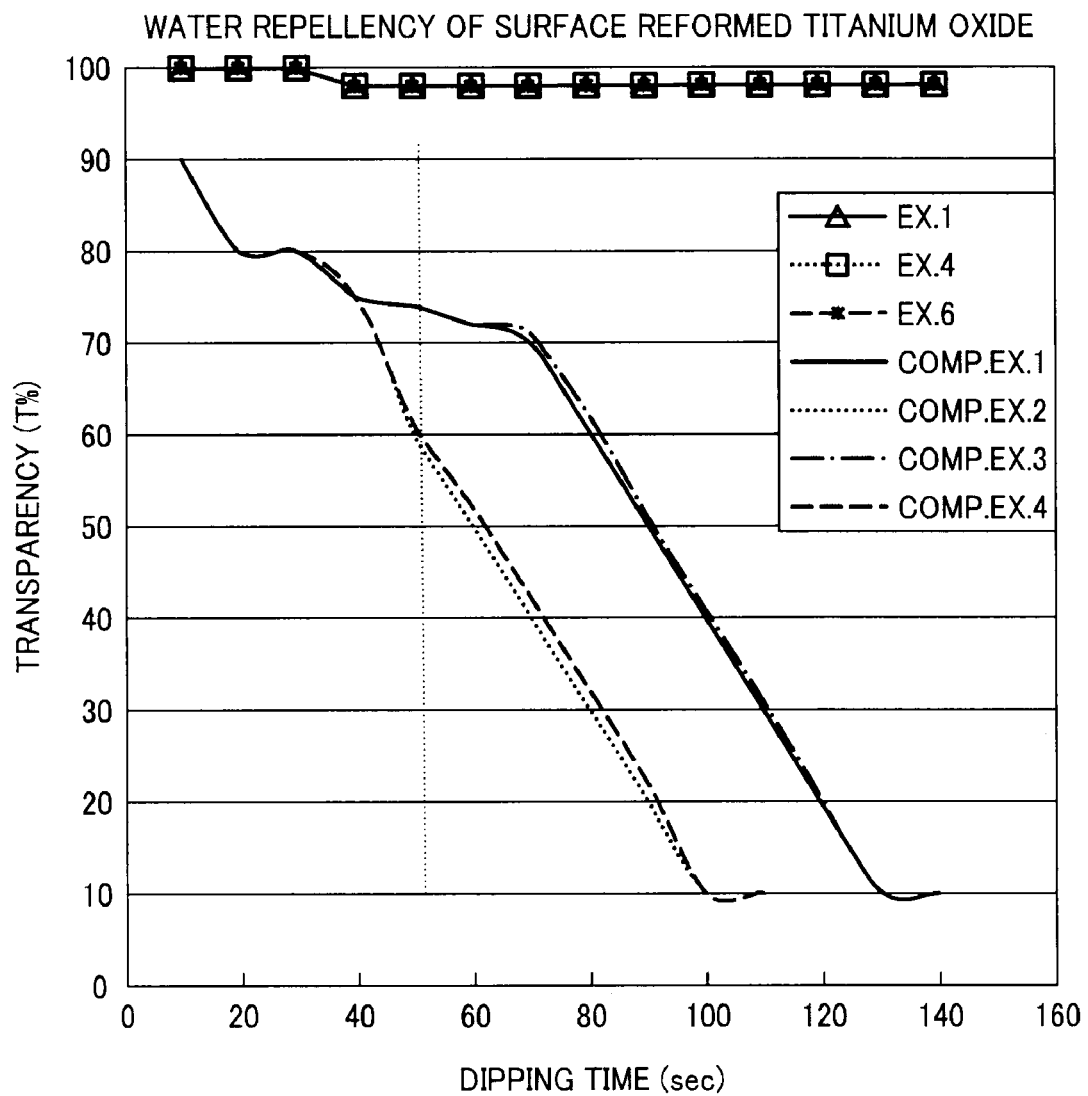

EXTERNAL ADDITIVE, METHOD OF MANUFACTURING SAME AND TONER

BACKGROUND OF THE INVENTION

Field of the Invention

The present invention relates to an external additive, a method of manufacturing the external additive and a toner including the external additive.

The developing agent for use in electrophotography, electrostatic recording, electrostatic printing, etc., is temporarily attached in the development process to a latent image bearing member such as a photoreceptor on which a latent electrostatic image is formed, next transferred from the photoreceptor to a transfer medium such as transfer paper in the transfer process, and then fixed on the transfer medium in the fixing process. As the developing agent to develop a latent electrostatic image formed on the latent image bearing surface of the latent image bearing member, there are known developing agents such as a two component developing agent including carrier and toner and a single component developing agent (magnetic toner, non-magnetic toner) which does not require carrier. In the two component development system, the toner particle attaches to the surface of the carrier, which inevitably causes deterioration of the developing agent. Also, in the two component development system, only the toner is consumed and thus the toner density in the developing agent decreases. Therefore, it is necessary to maintain the mixing ratio of the toner to the carrier, resulting in size increase of the development device. On the other hand, in the single component development system, the size of the development device has been reduced due to sophistication of the development roller, etc.

In recent years, with the advance of office automation and colorization in the business environment, chances of outputting graphs made by a home computer, images taken by a digital camera, pictorial documents scanned by a scanner, etc., as material resources for presentation by a printer has been increasing in addition to documents of only characters. An image output by a printer occasionally has a complicated setup containing a solid image, a line image, a half tone image, etc. and accordingly the demand for reliability for images, etc. has been increasing.

The electrophotography process using a typical single component developing agent is classified into a magnetic single component development system using a magnetic toner and a non-magnetic single component development system using a non-magnetic toner.

In the magnetic single component development system, images are developed by using a developing agent bearing member having a magnetic field generating device such as a magnet therein to hold a magnetic toner including a magnetic body such as magnetite and regulate the layer thickness of the toner by a layer thickness regulating member. This development system has been widely commercialized especially in the small-sized printer market in recent years. However, magnetic bodies are colored substances and most of them are black-base colored, which inevitably involves a problem that colorization is difficult.

On the other hand, in the non-magnetic single component development system, the toner does not have magnetic force. Therefore, a toner supply roller, etc. is press-contact with a developing agent bearing member to supply the toner to the developing agent bearing member. The toner is electrostatically held there and the layer thickness thereof is regulated by a layer thickness regulating member. Since the non-magnetic toner does not contain a colored magnetic substance, the non-magnetic toner has an advantage with regard to colorization. Furthermore, since the developing agent does not use a magnet, the development device can be reduced in weight and cost. Thus, the non-magnetic single component developing agent has been marketed for a small-sized full color printer.

With regard to the two component development system, the carrier is used when charging and transferring the toner. The toner and the carrier are sufficiently stirred and mixed in a development device and thereafter transferred to a developing agent bearing member and only the toner is used to develop the latent electrostatic image portion on the latent image bearing member. Therefore, it is possible to stably maintain the chargeability and the transferability of the toner for a relatively long time and such a development agent can suitably deal with a high speed development device.

In the non-magnetic single component development method, there is used a device which transfers the toner (developing agent) by at least one toner transfer member and develops the latent electrostatic image formed on the latent image bearing member with the transferred toner. It is preferred that the toner layer thickness on the surface of the toner transfer member is as thin as possible at this point. This applies to a case in which a carrier in a two component developing agent has an extremely small particle diameter. In addition, the toner layer thickness is made to be extremely thin especially when a single component developing agent (toner) having a high electric resistance is used since a developing device is required to charge the toner. Because, when this toner layer is thick, the toner layer is charged at only the surface and the portion close thereto and thus the toner layer is not uniformly charged as a whole. Therefore, the toner is required to be quickly charged and maintain a suitable amount of charge.

To deal with this, a charge control agent or an external additive is added to stably charge a typical toner. The charge control agent controls and maintains the amount of friction charge of toner. Specific examples of negative charge control agents include, but are not limited to, monoazo dye, metal salts and/or metal complex salts of salicylic acid, naphthoic acid, dicarboxylic acid, diazo compounds, and metal compounds of boron. Specific examples of positive charge control agents include, but are not limited to, quaternary ammonium salt compounds, imidazole compounds, nigrosine, and adine dyes.

However, among these charge control agents, there are a number of colored charge control agents, which are not suitable for color toner. In addition, among these charge control agents, there are charge control agents which are not compatible well with a binder resin. Therefore, such charge control agents existing on the surface of the toner which greatly contribute to charging are easily detached from the toner. This causes uneven charging among toner, which leads to contamination of a development sleeve and filming on a photoreceptor.

Therefore, good images are obtained at an initial stage by using a typical toner but gradually background fouling, etc. occur, which degrades image quality. Especially, when such a toner is continuously used for color photocopying while replenishing the toner, the amount of charge of the toner decreases so that the color tone of an image significantly changes from that at the initial stage as the image formation is repeated. This is a drawback and an image formation unit referred to as a process cartridge should be replaced when only a several thousands of images are printed. This is burden for the environment and a user. Furthermore, since most of such process cartridges include heavy metals such as chromium, the process cartridge itself involves a safety problem.

Furthermore, the demand for the printer has been increasing recently and the size reduction, high speed performance and low cost manufacturing are now in progress and improvement on reliability and durability is demanded for the printer. Thus, the toner is demanded to maintain various kinds of characteristics for an extended period of time. However, the charge control agent cannot maintain the charge control effect and contaminates the development sleeve and the layer thickness regulating member (blade and roller), resulting in deterioration of the chargeability of the toner and occurrence of filming on the photoreceptor.

Also, a developing agent having a good charging rise property is demanded to deal with a process in which development is performed in a short time with a small amount of developing agent to meet the demand for size reduction and high speed performance. With regard to development, there are various kinds of development systems for a two component developing agent and a single component developing agent. Among these, a non-magnetic single component development is suitable for a printer in terms of size reduction and weight reduction of a device. In this non-magnetic single component development system, since the toner is not supplied sufficiently to the development roller, and the development roller does not hold the toner well, the toner is forcibly attached to the development roller or the amount of the toner on the development roller is regulated by a blade. As a result, the toner tends to form filming on the development roller, which causes such problems that the working life of the development roller is shortened and the amount of charge in the toner is not stabilized. This prevents good development.

Therefore, studies have been made on an external additive which has functions of improving the transferability, developability and preservability of the toner in addition to functions of control and maintenance of the amount of triboelectric charge of the toner. To ameliorate these properties, a technology of an addition of hydrophobic silica is disclosed but the chargeability is excessively high when only the hydrophobic silica is used. In addition, the transferability is too good, which easily causes production of dust and scattering.

There are other technologies describing that titanium dioxide and/or titanium dioxide surface-treated by a coupling agent are added to toner.

One of these technologies describes that titanium dioxide is hydrophobized by using dialkyl dihalogenated silane and trialkyl halogenated silane, trialkyl alkoxy silane and dialkoxy silane.

Another technology of these technologies describes a toner formed by mixing and attaching powder of titanium dioxide hydrophobized by an alkyl trialkoxy silane having an alkyl group having 6 to 8 carbon atoms to mother toner particles.

Furthermore, another technology of these technologies describes a toner using an anatase type titanium dioxide and yet another describes a toner using an amorphous titania particulate surface-treated by a coupling agent. In another technology, surface-treated titanium dioxide particulates manufactured by a wet method is described.

However, the toners using the titanium dioxides described in these technologies mentioned above do not have sufficient charging stability, fluidity and environment stability for an extended period of time and furthermore, attach to a photoreceptor, resulting in production of abnormal images.

Furthermore, a combinational use of a hydrophobic silica and hydrophobic titanium dioxide is also disclosed in another technology but since both are highly hydrophobic, the amount of charge rises over time, which causes bad transfer, etc.

Consequently, the typical technologies described above have respective drawbacks.

There is another technology relating to a toner which includes a hydrophobized silica having a primary particle diameter of from 0.01 to 0.03 µm and surface-treated titanium dioxide particles having a primary particle diameter of from 0.01 to 0.03 µm and a specific surface area of from 60 to 140 $m^3/g$ which are manufactured by a wet method and has a water soluble component of not less than 0.2% by weight and a transmission ratio of not less than 35% at 300 nm and not less than 80% at 600 nm according to a UV absorption method.

However, the titanium dioxide particles in this technology does not lose but still maintains the hydrophilicity and attachment property by fine holes. Therefore, sufficient charging stability, fluidity and environment stability are not maintained for an extended period of time and furthermore, abnormal images are produced by attachment of the toner to a photoreceptor.

Another technology describes a toner using a hydrophobized anatase type titanium dioxide. This titanium dioxide has an average particle diameter of from 0.01 to 0.2 µm, a hydrophobization degree of from 20 to 98%, and a light transmission of not less than 40% to light having a wavelength of 400 nm and is manufactured by hydrophobization by a silane coupling agent in an aqueous medium. The hydorphobization used in this technology affects a volume resistance and resultantly a titanium dioxide having an excellently stable chargeability, excellent fluidity, excellent environment stability is obtained. However, an anatase type titanium dioxide is relatively soft in comparison with a rutile type titanium dioxide so that abrasion with and spent on carrier particles are concerned.

In another technology, there is described a method of manufacturing a mixture of titanium dioxide taking in silicon dioxide by removing ferrous sulfate from titanium steel, which is raw material of titanium dioxide, by centrifugal separation of a wet manufacturing method, condensing titanium sulfate, precipitating titanium hydroxide by hydrolytic cleavage method, adding silica component, and water-filtering the resultant repeatedly followed by baking. The hydrophobic treatment in this manufacturing method can be a dry method or a wet method.

By using the external additive manufactured by this manufacturing method, titanium dioxide having a relatively large particle diameter functions as a spacer so that a toner including the titanium dioxide increases its fluidity. In addition, since silicon dioxide is contained, the toner is negatively charged and the charging rises rapidly. This technology relates to the manufacturing method of titanium dioxide and silica is subject to hydrophobic treatment in the manufacturing method. However, the single effect (such as stable chargeability against environment and improvement on fluidity and effect of reducing a rise in charging over time) of the titanium dioxide is difficult to appear. To obtain such effects, problems should be solved such that the volume resistance, one of the electric characteristics of a toner, is maintained and silica having a different particle size from that of the titanium dioxide is used.

There is another technology which describes a toner using an external additive which is formed by surface-treating particles having a water soluble component in an amount less than 0.2% by weight manufactured by a wet method. The surface treatment agent used therein is a coupling agent or silicone oil. This is especially characterized by a combinational use of a negative polar preparation agent and a positive polar preparation agent as the surface treatment agent. It is preferred that the quantity of the surface treatment agent is from 0.1 to 25% by weight and the average particle diameter of the titanium dioxide is from 5 to 100 nm.

There is a manufacturing example in this technology in which a mixture solvent of alcohol and water is reacted with silane coupling agent. In general, silane coupling agents tend to react with water so that it is easy to predict that silanol reaction is conducted even at room temperature. Thus, the probability of coexistence with titanium dioxide particles is high.

In the manufacturing method mentioned above under the same condition, since the surface treated particulates react with water as a solvent, the hydrophobic degree is suitable when there is a difference between a non-treated product and a treated product. When there is a difference, the purpose of surface treatment is fulfilled.

As described above, there are common descriptions among the technologies described above in terms of hydrophobic treatment. However, these are limited to only qualitative contents since there is no specification about the particle diameter of the titanium dioxide functioning as a material in the treatment or the hydrophobized material and the content thereof obtained after the hydrophobic treatment is complete.

Especially, in the case in which a silane coupling agent is used, there is no description about network structure of the hydrophobic group in the condensation reaction. Therefore, it is inferred that alkyl silane compounds are absorbed (physically absorbed to fine hole) to titanium dioxide.

Thus, when such an external additive is used for a toner, the surface treated layer of the titanium dioxide particles is broken, which causes a problem such as spent on carrier particles. Consequently, when the toner is used in an image forming apparatus over an extended period of time, the toner tends to be affected by the environment change in the external air, which adversely affects the image quality.

SUMMARY OF THE INVENTION

Because of these reasons, the present inventors recognize that a need exists for an external additive which stably controls and maintains the amount of triboelectric charge of a toner, stably maintains triboelectric property hardly affected by environment change and prevents the production of abnormal images caused by attachment of toner to a photoreceptor during development of toner images, a toner to which the external additive is added, and an image forming method using the toner.

Accordingly, an object of the present invention is to provide an external additive which stably controls and maintains the amount of triboelectric charge of a toner, stably maintains triboelectric property hardly affected by environment change and prevent the production of abnormal images caused by attachment of toner to a photoreceptor during development of toner images, a toner to which the external additive is added, and an image forming method using the toner.

Briefly this object and other objects of the present invention as hereinafter described will become more readily apparent and can be attained, either individually or in combination thereof, by an external additive including a titanium dioxide having a water-soluble component of at least 0.2% by weight; and a fluorosilane compound, wherein the titanium dioxide is surface-reformed by the fluorosilane compound.

It is preferred that, in the external additive mentioned above, the titanium dioxide is rutile type titanium dioxide.

It is still further preferred that, in the external additive mentioned above, the external additive floats on purified water at 20° C. for at least 10 minutes.

It is still further preferred that the external additive mentioned above further includes fluorine in an amount of from 0.1 to 2.3% by weight.

It is still further preferred that, in the external additive mentioned above, the titanium dioxide is manufactured and refined from titanium ore by a wet method.

It is still further preferred that, in the external additive mentioned above, a particle size in liquid (D50) after surface-reforming ranges from 0.04 to 0.100 µm.

As another aspect of the present invention, a method of manufacturing an external additive is provided which includes reacting a mixture of a non-polar solvent in which titanium dioxide having a water-soluble component in an amount of at least 0.2% by weight is dispersed and an alcohol solvent in which a fluorosilane compound is dissolved and evaporating the non-polar solvent and the alcohol solvent to obtain powder and baking the powder.

It is preferred that, in the method of manufacturing an external additive mentioned above, the titanium dioxide is rutile type titanium dioxide.

It is still further preferred that, in the method of manufacturing an external additive mentioned above, the titanium dioxide is obtained by neutralizing titanium hydroxide.

It is still further preferred that, in the method of manufacturing an external additive mentioned above, the titanium dioxide is manufactured and refined from titanium ore by a wet method.

It is still further preferred that, in the method of manufacturing an external additive mentioned above, baking is performed after reacting the mixture is complete.

It is still further preferred that, in the method of manufacturing an external additive mentioned above, whether reacting the mixture is complete is determined by detecting a non-reacted fluorosilane compound.

It is still further preferred that, in the method of manufacturing an external additive mentioned above, the external comprises fluorine ranging from 0.1 to 2.3% by weight.

It is still further preferred that, in the method of manufacturing an external additive mentioned above, the particle size in liquid (D50) after reacting the mixture ranges from 0.04 to 0.1 µm.

As another aspect of the present invention, a toner is provided which includes mother toner including a coloring agent and a binder resin including a thermoplastic resin including a polyester resin and the external additive mentioned above while the external additive being attached to the mother toner.

It is preferred that the toner mentioned above is a pulverized toner.

It is still further preferred that, in the toner mentioned above, the external additive mentioned above is attached to the mother toner in an amount ratio of from 0.5 to 1.5% by weight.

These and other objects, features and advantages of the present invention will become apparent upon consideration of the following description of the preferred embodiments of the present invention taken in conjunction with the accompanying drawing.

BRIEF DESCRIPTION OF THE DRAWING

Various other objects, features and attendant advantages of the present invention will be more fully appreciated as the same becomes better understood from the detailed description when considered in connection with the accompanying drawing in which like reference characters designate like corresponding parts throughout and wherein:

FIGURE is a graph illustrating the relationship between the transmission ratio and the dipping time of titanium oxides.

DETAILED DESCRIPTION OF THE INVENTION

The present inventors focused on toner composition to solve the drawbacks described above and have intentionally studied on the external additive among binder resins, coloring agents and external additive contained in a toner related to the present invention. As a result, when titanium dioxide surface-reformed by a particular method is used as an external additive to a polyester resin which is suitable as the binder resin in terms of color development property and image durability, it is found that the surface of the obtained particle has a strong water repellency and is not affected by moist in the atmosphere. It is also found that this external additive contributes to maintaining a high amount of charge and having a sharp distribution thereof and improves rise in charging and anti-background fouling property. Furthermore, environment change occurring during image formation for an extended period of time does not affect the image quality. Moreover, contamination and filming on a photoreceptor can be prevented for a long time, for example, more than tens of thousands of images.

The external additive and the toner of the present invention will be described below in detail first with reference to several embodiments and accompanying drawing.

The external additive of the present invention is an external additive for use in a toner for developing electrostatic images and is a material formed by surface-reforming a titanium dioxide particle having a water soluble component in an amount of not less than 0.2% by weight with a fluorosilane compound.

The toner of the present invention is formed of mother toner including a binder resin, which is a thermoplastic resin formed of a polyester resin, and a coloring agent, and the external additive of the present invention attached to the mother toner. In addition, a charge control agent, a hydrophobic silica, etc. can be also contained.

External Additive (Surface Reformed Titanium Dioxide)

Titanium Dioxide

Titanium dioxide for use in the external additive of the present invention is prepared by reacting titanium iron and steel (ilmenite) as raw material with strong sulfuric acid to obtain titanium sulfate, removing the iron component therefrom, and hydrolyzing the titanium sulfate to precipitate titanium hydroxide. The present invention is notable by a hydrophilic reforming method for the surface of the titanium dioxide particles.

Typical toner for use in developing electrostatic images also uses titanium dioxide obtained by hydrolyzing the titanium hydroxide mentioned above for surface treatment. In the present invention, the titanium hydroxide is neutralized followed by dehydration treatment for crystallization. Therefore, chemical absorption thereof on the surface of the titanium dioxide particles is rapidly conducted when surface reformed especially with a silane coupling agent. This mechanism is ascribable to the existence of electrolyte composition, that is, cations such as alkali metal ions, and anions. Titanium dioxide can be microparticulated from the typical order of several hundreds of nm to an order of nm. The particle size of the titanium dioxide is calculated by measuring the transmission factor with optical light and ultraviolet. Since the surface is reformed to a degree of an order of nm, the surface treatment leads to strong water repellency. Since the reaction conducted in an organic solvent for use in such microparticulation is preferably under the presence of a polar-protic solvent, it is extremely suitable to use an alcohol as the organic solvent.

Definition of Surface Reformed Layer

Surface-reforming described in the present invention means reforming in which silane compound produces siloxane linkage by condensation reaction of a fluorosilane compound and is present as a condensation product on the surface of titanium dioxide particles which undermines hydrophilic property and absorption property by fine holes of the titanium dioxide in the physical chemistry manner. There are network structures formed by polysiloxane linkage on the surface of the surface-reformed titanium dioxide particle. Therefore, this surface treatment imparts strength to the surface of the titanium dioxide particles against physical friction and abrasion of carrier particles, etc. several times as much as typical surface treatment does. In addition, this surface-reformed titanium dioxide has strong water repellency.

There is a clear difference between surface reforming and surface treatment in terms of effect as described above. Also, the synthesis methods thereof are different. Typical reaction using a silane coupling agent proceeds in hydrolysis mechanism because of the presence of water so that pH is adjusted. By contrast, in the present invention, water is not used for the surface reforming at all and actually the network structure is formed by de-alcohol in the condensation reaction.

Strong water repellency extremely restrains (reduces) moisture absorption under environment change and the reformed layer is hardly removed during continuous mixing with carrier particles.

Typical Manufacturing Method

In the method described above in which a coupling agent or silicon oil is used as a surface treatment agent, water is mixed in an organic solvent in which titanium dioxide is dispersed. Since there is an optimal pH range, the reaction proceeds while adjusting pH. This pH adjustment of the aqueous solution makes a point especially in the case of aminosilane, etc.

In addition, in this method, the usage of aminosilane compound is necessary to control charging of the toner to be positive. However, since the amino substituent is hydrophilic, the toner is affected by humidity change in the environment.

Another technology describes the reaction between titanium hydroxide as material and a silane compound. As described above, there is no sufficient refinery treatment and hydrophobic reaction thereafter is not sufficiently reactive. Therefore, a large amount of silane coupling agent is required.

Especially, with regard to a continuous long run length under the environmental change, typical hydrophobization treatment method for an external additive is not effective.

In the present invention, maintaining the image quality during a continuous long run length and in the environmental change is notable. When used as a developing agent, the performance of the external additive has an impact on the anti-abrasion property against carrier particles, spent on carrier particles, and filming on the surface of a photoreceptor. However, the typically used evaluation method for the degree of hydrophoby is not suitable for indicating the correlation between the print image quality and a long run length or the environmental change. Especially, there is a problem in that no significant difference is seen when the degree of hydrophoby is greater than 30. Thus, the evaluation method described later has a good result because it is not affected by alcohol in comparison with the typical evaluation method and preferably adopted for the present invention.

The toner of the present invention is preferred to be negatively chargeable. The surface treated layer formed of a fluorosilane compound is preferred to be thin and microparticulated in light of uniform charging. Thus, silanol reaction in the surface treatment process is conducted without using a solvent mixture of water while some of the manufacturing methods described above use water.

Thereafter, the condition of the condensation reaction is set in order that siloxane linkage is easily produced from a silane compound by avoiding production of remaining silanole compounds. That is, the surface of surface reformed titanium dioxide particles is considered to be covered with the network structure of polysiloxane linkage and multiple siloxane linkages are identified and certified by infrared emission spectroscopy.

As described above, the surface reforming of the present invention relates to forming a complex structure using polysiloxane linkage.

As the external additive externally added to mother toner for developing electrostatic images for use in the toner of the present invention, typically used silicon dioxide can be used in combination with the surface reformed titanium dioxide as the external additive of the present invention. Hydrophobized silicon dioxide is preferred. Hydrophobized silica having a primary particle diameter of from 0.01 to 0.03 μm is preferred in particular. As to the titanium dioxide, hydrophobized and surface reformed titanium dioxide having a primary particle diameter of from 0.01 to 0.03 μm and a specific surface area of from 60 to 200 $m^2/g$ is preferred. By using these additives together with the polyester resin mentioned above, stably charged toner is obtained. In addition, the specific surface area of the surface reformed titanium dioxide is preferably from 60 to 140 $m^2/g$.

By attaching surface reformed titanium dioxide having a primary particle diameter of from 0.01 to 0.03 μm and a specific surface area of from 60 to 200 $m^2/g$ to the surface of mother toner for developing electrostatic images, fluidity is imparted, charging property is stabilized (especially, excessive rise in charge is prevented) and the developability on a development roller and a photoreceptor therefrom is improved. The addition amount of the surface reformed titanium dioxide as the external additive of the present invention is preferred to be from 0.5 to 10 parts by weight based on 100 parts by weight of the mother toner. Thereby, the thickness of the thin layer of toner on the development roller can be uniformed, meaning evenness of the thin layer is significantly improved. Furthermore, the occurrence of white streak on an image caused by adhesion of toner to a developing agent applicator (blade) due to stirring of a development roller for an extended period of time can be prevented. When the addition amount is too large or too small, the thin layer of the toner on the development roller tends to be non-uniform so that non-uniform development or image may be obtained or white streak caused by adhesion of toner to the development agent applicator may occur. When the addition amount is too small, the fluidity of the toner tends to be insufficient so that a required amount of toner is not supplied or the charging property tends to be excessively high so that the development by toner may not be sufficient. When the addition amount is too large, the charging property of the toner tends to be insufficient so that the toner may scatter from the development roller or background fouling may occur. In addition, in the present invention, the addition amount of titanium dioxide is more preferred to be from 0.8 to 4.0 parts by weight based on 100 parts by weight of mother toner. The mother toner is materials excluding external additives including the surface reformed titanium dioxide from the toner and thus represents particles including at least a binder resin and a coloring agent in the middle of manufacturing process.

As described above, a toner for developing electrostatic images with a stable charging property is obtained by using titanium dioxide having a particular ability together with a binder resin which is a thermoplastic resin formed of the polyester resin described later.

The surface reformed titanium dioxide as the external additive for use in the present invention includes a water soluble component in an amount of not less than 0.2% by weight and the surface of particles of the surface reformed titanium dioxide is reformed by a fluorosilane compound. In addition, the titanium dioxide is preferred to be a rutile type titanium dioxide. Furthermore, the external additive of the present invention is preferred to float on the surface of purified water at 20° C. as a single substance for at least 10 minutes without immersion.

Evaluation Method for Water Repellency of Titanium Dioxide

The evaluation method of water repellency of the surface reformed titanium dioxide as the external additive of the present invention is as follows:

Weigh 0.02 g of sample titanium powder; weigh and place 25 ml of deionized water at 20° C. in a 50 ml beaker and maintain the beaker still to a degree that the water surface is not swing; place the measured titanium powder on the center of the surface of the water; and measure the time from when the titanium powder is placed until the water is clouded. The titanium powder initially floats but the water immerses the titanium powder over time, resulting in white turbidity of the titanium powder in the water. The transmission factor of the water is measured by a spectrophotometer (manufactured by Shimadzu Corporation) with a wavelength of 380 nm at 10 minutes after the titanium dioxide is placed and thereafter the white turbidity of the water is evaluated.

Evaluation Criteria

Bad: Transmission factor is less than 60% at 10 minutes after the titanium powder is placed.

Fair: Transmission factor is not less than 60% to less than 80% at 10 minutes after the titanium powder is placed.

Good: Transmission factor is 80% or higher at 10 minutes after the titanium powder is placed.

When a surface reformed titanium dioxide which floats on the water for at least 10 minutes without immersion is used in a two component development agent, the developing agent has good anti-abrasion property against carrier particles. By contrast, when a surface reformed titanium dioxide which is immersed by water within 10 minutes is used in a two component development agent, the amount of charge of the toner fluctuates over time during stirring. It is thus found that a surface reformed titanium dioxide which is immersed by water within 10 minutes does not sufficiently control the variance in the amount of charge of toner.

The surface reformed titanium dioxide as the external additive of the present invention is preferred to block immersion of water for at least 10 minutes and float on the surface of the water. To be specific, the surface reformed titanium dioxide has a strong water repellency such that the time to be taken before the water immerses the titanium dioxide is at least 10 times as long as that for a typically surface treated product (refer to FIGURE).

According to the evaluation method mentioned above for water repellency, the characteristic ascribable to the surface tension which repels water absorbed on the surface of a particle can be evaluated among the characteristics of evaluating the degree of hydrophoby.

When compared with a typical hydrophobic group in which the number of carbon atoms is increased, fluorosialne compounds are existent on the surface reformed titanium dioxide as the external additive of the present invention while forming network structure, which reduces the surface tension and improves water repellency. This leads to improvement on the print image quality.

Maintaining the image quality under the environmental change and/or during a continuous long run length is a problem to be solved. In the case of a development agent, good performance of an external additive is inevitably required in terms of anti-abrasion property with carrier particles, spent on carrier, filming on the surface of the photoreceptor, etc. However, the effect of an external additive prepared by a typical hydrophobic treatment method is not sufficient especially for a continuous run length under the environmental change.

The amount of water soluble component of the titanium dioxide which is subject to surface reforming related to the present invention is not less than 0.2% by weight, preferably from 0.2 to 0.5% by weight and more preferably from 0.2 to 0.4% by weight. When the amount is too small, the washing process for refinement tends to be long, which boosts the cost. When the amount is too excessive, a problem occurs to the hydrolysis reaction from titanium hydroxide.

The reaction in the process of the surface reforming related to the present invention is conducted in an organic solvent. The particle size (D50) in liquid of the titanium dioxide as the core material is preferably from 0.040 to 0.100 μm. When the particle size (D50) in liquid is too small, the aggregation force among particles tends to be strong so that it is difficult to obtain titanium dioxide having a suitable particle size. When the particle size (D50) in liquid is too large, abnormal images having streaks and/or with uneven density tends to be obtained when used as an external additive. Furthermore, the particle size (D50) in liquid of the external additive after surface reforming preferably ranges from 0.040 to 0.100 m. The particle size (D50) in liquid can be measured by a particle size distribution measuring device (UPA series, manufactured by Nikkiso Co., Ltd.) available in the market.

A fluorosilane compound is preferably attached to the surface of the reformed titanium dioxide particle functioning as the external additive of the present invention in an amount of from 1 to 3% by weight. When the cover ratio by the fluorosilane compound is too great, the amount of charge of toner tends to vary, the effect of raising the amount of charge tends to be limited and the cost may increase, which are not preferred. By contrast, when the cover ratio by the fluorosilane compound is too small, the water repellency tends to be not sufficient so that it is not possible to restrain the variance in the amount of charge over time caused by stirring with carrier particles.

Next, the amount of fluorine element in the surface reformed titanium dioxide functioning as the external additive of the present invention ranges from 0.1 to 2.6% by weight, preferably from 0.1 to 2.3% by weight and more preferably from 0.8 to 2.2% by weight. When the amount of fluorine element is too large, the material cost increases. By contrast, when the amount of fluorine element is too small, the effect tends to be insufficient.

The titanium dioxide for use in the present invention is preferably manufactured by a wet method. Titanium is generally contained in a mineral ore such as rutile, anatase, brookite and ilmenite. Titanium dioxide is manufactured by a sulfuric acid method in which strong sulfuric acid is added to such a mineral ore to dissolve it or a chlorine method in which such a mineral ore is red-hot and dehydrated with a carbon compound and the result is exposed to chlorine gas. In both cases, titanium hydroxide $Ti(OH)_2$ is refined and titanium dioxide crystal is precipitated by hydrolysis at the final process. Therefore, the obtained titanium dioxide includes a water soluble component in a certain amount. These are, for example, alkali metal ions and/or acid component contained in the mineral ore, a catalyst or a treatment agent for use in the manufacturing process. Specific examples thereof include, but are not limited to, $PO_4^{2-}$, $SO_4^{2-}$, $Cl^-$, $Na^+$, $Mg^{2+}$ and $Li^+$. It is known in general that these water soluble components have an impact on chargeability and electric resistance. When the content of the water soluble component is controlled to be less than 0.2% by weight, a large amount of charge is said to be maintained. The chargeability or resistance is also affected by the moisture content in the titanium dioxide and a functional group existing on the surface thereof in addition to the content of the water soluble component.

However, the objective of the external additive related to the present invention does not achieve a high chargeability but to obtain a restrained and suitable amount of charge and restrain the variance of the chargeability against the moisture variance. Especially, according to the particular surface reforming agent and manufacturing method, the electric characteristics and the particle size property are found to have effect on achieving the objective. That is, by using titanium dioxide having a water soluble component in an amount not less than 0.2% by weight, a rise in the amount of charge over time is limited. Furthermore, this effect increases in a combinational use of silica. The quantitative determination of the water soluble component is according to JIS K5116-1973.

In the technology in which a coupling agent, etc. is used for surface treatment of titanium dioxide to obtain higher function, it is known that the content of a water soluble component of the titanium dioxide has an impact on the surface treatment. The present invention reforms the character of titanium dioxide by the surface reforming treatment (chemical treatment causing a non-reversible result) in comparison with the surface treatment (absorption phenomenon in which detachment treatment can be easily performed) and therefore has an impact on the electric resistance and chargeability of the obtained surface reformed titanium dioxide. In addition, the dispersion degree in the surface reforming treatment changes secondary aggregation of the titanium dioxide.

Generally, uniform treatment methods and high dispersion treatment methods can be considered to maintain the primary particle diameter. However, there are drawbacks such as a rise in the charging over time or attachment to a photoreceptor when titanium dioxide is singly used. Therefore, such drawbacks are solved by using a fluorosilane compound functioning as a reforming agent for use in surface reforming treatment. Furthermore, since the particle size distribution after surface reforming treatment is determined by controlling the titanium particle diameter before the treatment, the secondary aggregation problem involved with the typical surface treatment is solved. Consequently, although the dispersion degree becomes high in the present invention, the drawbacks described above are solved by setting a low resistance.

As the fluorine containing compound for use in the silane coupling agent, a compound having a perfluoroalkyl group is preferred and represented by $C_nF_{2n+1}$, where n is preferably an integer of from 1 to 12.

In addition, the fluorosilane compound for use in the present invention is preferably represented by the following chemical formula:

$$C_nF_{2n+1}(R)Si(OR)_3$$

In the chemical formula, it is preferred that R independently denotes an alkyl group having 1 to 3 carbon atoms and n is from 1 to 12.

These compounds can be selected from silane coupling agents or fluorine treatment agents for use in water repellent treatment in the market. Especially, silane compounds including fluorine compounds are preferred in terms of the network structure of a hydrophobic group produced in the condensation reaction from a silane coupling agent.

In addition, before the silane coupling treatment, it is preferred that titanium dioxide is subject to zinc ion treatment. In the zinc ion treatment on the surface of the titanium dioxide particles, the surface is subject to anchor treatment by zinc element, thereby restraining the aggregation of the titanium dioxide particles. Also, the titanium dioxide particles are subject to silane coupling treatment in an organic solvent selected in terms that the electric repulsive force which affects the particles hardly works so that a silane condensed compound having a network structure of polysiloxane linkage is present on the surface of the titanium dioxide particles. The layer of the thus obtained silane condensed compound is not only water repellent and but also excellent in anti-abrasion property and strength against physical impact due to the anchor treatment in comparison with the case of single silane coupling agent surface treatment. Therefore, the thus obtained external additive is several times as strong against the physical contact or abrasion of carrier particles as a typically obtained external additive which is surface treated singly by a silane coupling agent. That is, the thus obtained external additive is also excellent when used as a developing agent including carrier particles. The zinc treatment of titanium dioxide can be conducted by, for example, dipping titanium dioxide in a solution containing a zinc ion such as zinc chloride aqueous solution or spraying the solution to titanium dioxide. Also, zinc chlorides or zinc sulfates can be used for in the manufacturing process of titanium dioxide or after purchasing titanium dioxide in the market, the titanium dioxide is subject to treatment using the zinc ion containing solution mentioned above.

Surface Treatment Method of Titanium Dioxide Particle Using Trifluorosilanes

Synthesis Method

The titanium dioxide for use in the present invention is crystal prepared by neutralizing titanium hydroxide followed by dehydration. A silane coupling agent formed of a trifluorosilane compound is used and an alcohol is selected as a reaction solution. The titanium dioxide which is subject to surface treatment is rutile type having a water soluble component in an amount of not less than 0.2% by weight. The titanium dioxide having a solid portion density of from about 38 to about 42% is dispersed in toluene (non-polar solvent) followed by pulverization until the particle size thereof becomes from 0.05 µm to 0.1 m by a bead mill (NVM-2 type, manufactured by Imex Co., Ltd.) having a particle size of 0.5 mm. The resultant solution is mixed with an alcohol solvent in which a trifluorosilane compound is dissolved and the liquid mixture is placed in a flask (For example, 250 g of titanium dioxide is dissolved in toluene solvent to obtain a 40% liquid of 500 g and the amount of 20% methanol solution of trifluorotrimethoxy sialne is 180 g.). Then, the mixture is heated in an oil bath to 60° C. to conduct reaction for about 6 hours while stirred at 60 rpm by a stirrer. Next, the mixture is heated to 130° C. to vaporize toluene and methanol. After the temperature of the oil bath is checked to be 130° C., the mixture is left for baking for 6 hours.

A minute amount of the surface treated titanium dioxide prepared by the reaction process described above is collected and analyzed by GAS CHROMATOGRAPH GC-14 (manufactured by Shimadzu Corporation). When non-reacted trifluorosilane compound remains after GC analysis, a peak is detected at between 110 and 150° C. but when the surface treatment (condensation reaction) is complete, the peak disappears. Thereby, it is possible to distinguish the method of the present invention from a typical manufacturing method by this Rt.

Fluorine element on the surface is quantity determined by an Automatic burning halogen sulfur analysis system (burning tube air method—ion chromatograph method)(burning device, manufactured by Yanako Group and an ion chromatograph ICS 200 type, manufactured by Dionex Corporation). The content of fluorine element based on titanium dioxide is preferably from 0.1 to 2.6% by weight and more preferably from 0.1 to 2.3% by weight.

Synthesis Example A 40 g of a marketed product of trifluoropropyl trimethoxy silane (Z-6333 CAS NO. 429-60-7, manufactured by the Dow Chemical Company) is dissolved in 200 g of ethanol solvent.

Next, a market product (MT150, manufactured by Tayca Corporation) of titanium dioxide having a water soluble component in an amount of 0.31% by weight is dispersed in toluene solvent such that the solid portion density is 37%. The resultant is pulverized by a bead mill (NVM-2 type, manufactured by Imex Co., Ltd.) having a bead diameter of 0.5 mm for about 2 hours to obtain particles having an average particle diameter of 0.047 µm (measured by MICROTRAC UPA-150, manufactured by Nikkiso Co., Ltd.) and thereafter 630 g is weighed.

Furthermore, silane solution is mixed with the toluene solvent in which the titanium dioxide is dispersed and the mixture is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 223 g of sample surface reformed titanium dioxide is collected and the attachment amount of trifluoromethoxy silane is 2.0% by weight based on the surface reformed titanium dioxide.

Synthesis Example B 40 g of a marketed product (Z-6333, manufactured by Toray Industries, Inc.) of trifluoropropyl trimethoxy silane and a market product (Z-6366, manufactured by Toray Industries, Inc.) of methyltrimethoxy silane in equivalence ratio is dissolved in 200 g of methanol solvent.

Next, a market product (MT150, manufactured by Tayca Corporation) of titanium dioxide having a water soluble component in an amount of 0.31% by weight is dispersed in toluene solvent such that the solid portion density is 37%. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g is weighed.

Furthermore, silane solution is mixed with the toluene solvent in which the titanium dioxide is dispersed and the mixture is transferred to a flask placed in an oil bath. The mixture is heated to 60° C. for reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the amount of the solvent of the prescribed amount, the temperature is set to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced by silanol reaction has disappeared. Baking is complete when the amount of the solvent for gas chromatography, especially the amount of methanol, is 190 ppm or below. 221 g of sample surface reformed titanium dioxide is collected and the attachment amount of trifluoromethoxy silane is 2.0% by weight based on the surface reformed titanium dioxide.

Synthesis Example D (For Comparison)

40 g of a marketed product (Z-6333, manufactured by Toray Industries, Inc.) of trifluoropropyl trimethoxy silane and a market product (Z-6366, manufactured by Toray Industries, Inc.) of methyltrimethoxy silane in equivalence ratio is dissolved in a mixture solvent of 190 g of methanol and 10 g of water. The solution is left in an experiment room at 25° C. for one day and one night, the solution becomes cloudy, which is not observed at Synthesis Examples A to C. However, the surface treatment is performed in the same manse as in Synthesis Examples A to C.

When the amount reaches 90% by weight of the solvent of the prescribed amount, the temperature is set to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced by silanol reaction has disappeared. Baking is complete when the amount of the solvent for gas chromatography, especially the amount of methanol, is 190 ppm or below. 231 g of the sample surface reformed titanium dioxide is collected and the attachment amount of trifluoromethoxy silane is 0.10% by weight based on the surface reformed titanium dioxide.

Synthesis Example E (For Comparison)

MT-150A (rutile type titanium dioxide having an average particle diameter of 15 nm) manufactured by the sulfuric acid method is used as a wet method manufactured titanium dioxide. This titanium dioxide contains a water soluble component in an amount of 0.30% by weight.

1.0 g of 3,3,3-trifluoropropyl trimethoxy silane (manufactured by Shin-Etsu Chemical Co., Ltd.) which has fluorine attached to the carbon atoms at the third to tenth position as a coupling agent, 0.1 g of γ-aminopropyl triethoxy silane (manufactured by Toray Industries, Inc.) as a coupling agent having an amino group and 0.5 g of hexamethyl silazane (manufactured by Toray Industries, Inc.) are dissolved in 10 g of teterahydrofuran. 8 g of fine powder prepared by water-washing titanium dioxide such that the amount of the water soluble component thereof is 0.11% by weight is added to the mixture solvent. Subsequent to mixing and stirring by a high speed mixer, the solvent is removed from the mixture by an evaporator. After the resultant is heated at 150° C. in a high temperature bath for one hour, the resultant is pulverized by a mortar to obtain an external additive. The attachment amount of trifluromethoxy silane is 0.20% by weight based on the surface reformed titanium dioxide.

The titanium dioxide powder manufactured by the surface treatment method as described above is analyzed by gas chromatography and the fluorine contained at the surface of the titanium dioxide is analyzed by the method described above.

The differences between the present invention and typical products are described in (I) to (III) below:
(I) there is no problem when titanium dioxide powder as material has a water soluble component in an amount not less than 0.20% by weight;
(II) in the baking process, the organic solvent in reaction is dried and silanol reaction is identified. After complete disappearance of Rt peak is confirmed before the baking process, the resultant is heated so that the reformed surface has network structure having siloxane linkage; and
(III) the content of fluorine contained in the reformed surface ranges from 0.1 to 2.6% by weight in weight conversion.

The titanium dioxide manufactured in Synthesis Examples A to C is the surface reformed titanium dioxide of the present invention. However, when a silane coupling agent is reacted with a mixture solvent of alcohol and water as a simple method of hydrophbizing the surface of titanium dioxide, silane is reacted with water so that the surface reforming treatment does not proceed, which results in simple hydrophobization of the surface.

In addition, in the condensation reaction in the baking process, although depending on the structure of a silane coupling agent, the condensation reaction ascribable to forming of network structure does not complete without conducting the baking process for a long time after identification of silanol reaction, then dehydration and dealcohol.

Measuring of Transmission Factor

As the indicator of the particle size of the surface reformed titanium dioxide, there is transmission factor thereof in a particular solvent. In the present invention, the transmission factor is preferably at least 35% at 300 nm and at least 80% at 600 nm in the UV light absorption method. The surface reformed titanium dioxide contains a water soluble component in a large amount to set the electric resistance of the toner to be low. Therefore, such surface reformed titanium dioxide is desired to have a transmission factor of at least 35% at 300 nm. Since the electric resistance is low, the particle diameter is controlled to be small so that the titanium dioxide is easily dispersed on the surface of toner particles. On the other hand, the transmission factor at 600 nm is desired to be at least 80%. When the transmission factor is too low, the surface treatment is not evenly performed, which easily makes aggregated body of particles.

The transmission factor is measured as follows: precisely weigh 20 g of a reagent (polyoxyethylene octyl phenylether); place the reagent in a beaker; add deionized water to the reagent in order that the solid portion density is 1% by weight; disperse the solution with an ultrasonic wave oscillator (HONDA W-113); stir the solution by a magnetic stirrer to prepare a measuring solvent; place 25 mg of a sample material of titanium dioxide in a flask (300 ml); add the measuring solvent therein; stir and disperse the solution by a magnetic stirrer for 5 minutes; set the flask to be subject to treatment by the ultrasonic oscillator for 5 minutes while shaking the flask with hand to promote dispersion of the aggregation body; measure 2 g of the liquid dispersion immediately after the dispersion; place the liquid dispersion in a sample vessel of 30 ml; add 18 g of deionized water thereto; shake the vessel softly while preventing bubbling; take the obtained mixture solvent in a glass cell having a path width of 1 cm; set the glass cell to a UV device (spectrophotometer UV-3100, manufactured by Shimadzu Corporation); and measure the absorption of light in the range of from 300 to 700 nm.

Toner for Developing Electrostatic Image

The toner of the present invention includes mother toner containing a binder resin of a thermoplastic resin formed of a polyester resin and a coloring agent and external additive described above of the present invention attached to the mother toner. The toner also can contain other materials such as a charge control agent and hydrophobic silica.

Binder Resin

The binder resin for use in the toner of the present invention is a thermoplastic resin formed of a polyester resin which is selected in terms of the color developability and image durability as the binder resin for full color. Since a color image is formed by laminating several color toner images, the toner layer is thickened, which easily causes loss of gloss or cracking and deficiency in the image due to shortage of strength of the toner layer. A polyester resin is thus used to maintain a suitable gloss and excellent strength of the toner layer.

The polyester resin as the binder resin can be generally obtained by esterification reaction between a polyalcohol and a polycarboxylic acid. Specific examples of the alcohol monomers among the monomers forming the polyester resin for use in the present invention include, but are not limited to, ethylene glycol, diethylene glycol, triethylene glycol, 1,2-propylene glycol, 1,3-propylne glycol, 1,4-butadiene ol, neopentyl glycol, diols such as 1,4-butene diol, 1,5-pentane diol and 1,6-hexane diol, bisphenol A, adducts of bisphenol A with an alkylene oxide such as hydrogenerated bisphenol A, polyoxypropylene bisphenol A, sorbitol, 1,2,3,6-hexane tetrol, 1,4-sorbitan, pentaerythritol, dipentaerythritol, tripentaerythritol, 1,2,4-butane triol, 1,2,5-pentane triol, glycerol, diglycerol, 2-methyl propanetriol, 2-methyl-1,2,4-butane triol, trimethylol ethane, trimethylol propane, 1,3,5-trihydroxybenzene and other tri- or higher alcohols.

Among these monomers forming polyester resins, especially a monomer using an adduct of bisphenol A with alkylene oxide as the main monomer is suitably used. When an adduct of bisphenol A with an alkykene oxide is used as a component monomer, a polyester having a relatively high glass transition temperature is obtained reflecting the characteristics of the bisphenol A skeleton. As a result, good anticopy blocking property and good high temperature preservability are obtained. In addition, the alkyl groups existing on the both sides of the bisphenol A skeleton function as a soft segment in the polymer, which leads to good color developability and image durability during toner fixing. Among alkylene groups in such adducts of bisphenol A with an alkykene oxide, ethylene group and propylene group are suitably used.

Specific examples of the acid monomers among the monomers forming the polyester resin in the present invention include, but are not limited to, maleic acid, fumaric acid, citraconic acid, itaconic acid, glutaconic acid, phtahlic acid, isophthalic acid, terephthalic acid, cyclohexane dicarboxylic acid, succinic acid, adipic acid, sebatic acid, azelaic acid, malonic acid, alkenyl succicnic acids or alkyl succinic acids such as n-dodecenyl succinic acid and n-dodecyl succinic acid, anhydrides thereof, alkyl esters thereof, 1,2,4-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-methylenecarboxypropane, tetra(methylenecarboxyl)methane, 1,2,7,8-octane tetracarboxylic acid, EnPol trimeric acid, their hydrates, their alkyl esters, their alkenyl esters and their aryl esters, and other tri- or higher carboxylic acids.

Specific examples of the alkyl esters, alkenyl esters and aryl esters include, but are not limited to, 1,2,4-benzene tricarboxylic acid triethyl. 1,2,4-benzene tricarboxylic acid trimethyl, 1,2,4-benzene tricarboxylic acid tri-n-butyl, 1,2,4-benzene tricarboxylic acid isobutyl, 1,2,4-benzene tricarboxylic acid tri-n-octyl, 1,2,4-benzene tricarboxylic acid tri-2-ethyl hexyl, 1,2,4-benzene tricarboxylic acid tribenzyl, and 1,2,4-benzene tricarboxylic acid tris(4-isopropyl benzyl).

There is no specific limit to the manufacturing method of the polyester for use in the present invention. Esterification reaction can be conducted by a known method. Ester exchange reaction can also be conducted by a known method optionally with a known ester exchange catalyst. Specific examples of such catalysts include, but are not limited to, magnesium acetate, zinc acetate, manganese acetate, calcium acetate, tin acetate, lead acetate and titanium tetrabuthoxide. Polycondensation reaction can be conducted by a known method optionally with a known polymerization catalyst. Specific examples thereof include, but are not limited to, antimony trioxide and germanium dioxide.

Coloring Agent

Suitable colorants (coloring agents) for use in the toner of the present invention include known dyes and pigments. Specific examples of the colorants include carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium dioxide, zinc oxide, lithopone and the like. These materials can be used alone or in combination.

The content of the coloring agent in the toner is preferably from 1 to 15% by weight, and more preferably from 3 to 10% by weight, based on the total weight of the toner. When the content is too small, the color developability of the toner may be degraded. A content that is excessively large may cause bad dispersion in the pigment in a toner, which leads to deterioration of color developability and electric characteristics.

Master batch pigments, which are prepared by combining a coloring agent with a resin, can be used as the coloring agent of the toner composition of the present invention. Specific examples such resins include, but are not limited to, polyester resins, styrene resins and their substituted polymers, styrene-based copolymer resins, polymethyl methacrylate resins, polybutyl methacrylate resins, polyvinyl chloride resins, polyvinyl acetate resins, polyethylene resins, polypropylene resins, epoxy resins, epoxy polyol resins, polyurethane resins, polyamide resins, polyvinyl butyral resins, polyacryl resins, rosin, modified rosins, terpene resins, aliphatic or alicyclic hydrocarbon resins, aromatic petroleum resins and chlorinated paraffin, paraffin waxes. These resins can be used alone or in combination.

Specific examples of the substituted styrene polymers include, but are not limited to, poly-(p-chlorostyrene) and polyvinyltoluene. Specific examples of the styrene-based copolymer resins include, but are not limited to, styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl-α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers.

The master batch mentioned above is typically prepared by mixing and kneading a resin and a coloring agent upon application of high shear stress thereto. In this case, an organic solvent can be used to boost the interaction of the colorant with the resin. In addition, flushing methods in which an aqueous paste including a colorant is mixed with a resin solution of an organic solvent to transfer the colorant to the resin solution and then the aqueous liquid and organic solvent are separated to be removed can be preferably used because the resultant wet cake of the colorant can be used as it is. In this case, three-roll mills can be preferably used for kneading the mixture upon application of high shear stress thereto.

The toner of the present invention can optionally contain known components such as a releasing agent, a charge control agent and magnetic material in addition to the mentioned above.

Releasing Agent

A releasing agent (wax) is preferred to be contained in the manufactured toner of the present invention to improve the releasability of the toner. The wax has a melting point of from 40 to 120° C. and preferably from 50 to 110° C. When the melting point is too high, the fixiability at a low temperature tends to be insufficient. When the melting point is too low, the anti-offset property and the durability tend to deteriorate. The melting point of a wax can be measured by a differential scanning calorimeter (DSC) method. That is, the melting peak value of a wax obtained when several mg of a sample of the wax is heated at a constant temperature rising speed, for example, 10° C./min, is determined as the melting point of the wax.

Specific examples of the wax for use in the present invention include, but are not limited to, solid paraffin wax, microcrystalline wax, rice wax, aliphatic acid amide based wax, aliphatic acid based wax, aliphatic monoketones, aliphatic acid metal salt based wax, aliphatic acid ester wax, partially saponified aliphatic acid ester based wax, silicone varnish, higher alcohol, and carnauba wax. In addition, polyolefins such as low molecular weight polyethylenes and polypropylenes can be also used. Especially, a polyolefin having a softening point of preferably from 70 to 150° C. or more preferably from 120 to 150° C. by a ring and ball method is preferred. In addition to synthesis wax, natural wax is also effective and carnauba wax is preferred. Natural wax can be singly used and it is possible to use a natural wax in combination with a synthesis wax taking advantage of the natural wax.

Charge Control Agent

Specific examples of the charge control agent include, but are not limited to, Nigrosine dyes, triphenylmethane dyes, metal complex dyes including chromium, chelate compounds of molybdic acid, Rhodamine dyes, alkoxyamines, quaternary ammonium salts (including fluorine-modified quaternary ammonium salts), alkylamides, phosphor and compounds including phosphor, tungsten and compounds including tungsten, fluorine-containing activators, metal salts of salicylic acid, metal salts of salicylic acid derivatives, etc. These can be used alone or in combination.

Specific examples of the marketed products of the charge control agents include BONTRON 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd.; copper phthalocyanine, perylene, quinacridone, azo pigments and polymers having a functional group such as a sulfonate group, a carboxyl group, a quaternary ammonium group, etc.

The content of the charge controlling agent is from 0.1 to 10 parts by weight, and preferably from 0.2 to 5 parts by weight, per 100 parts by weight of the binder resin included in the toner. When the content is too small, a suitable charge control property may not be obtained. When the content is too large, the toner tends to have too large chargeability, and thereby the electrostatic force of a developing roller attracting the toner increases, resulting in deterioration of the fluidity of the toner and a decrease of the image density of toner images.

Magnetic Material

The toner of the present invention may contain magnetic material and can be used as a magnetic toner. Specific examples of such magnetic material include, but are not limited to, iron oxides (magnetite, ferrite, hematite, etc.), metal (iron, cobalt, nickel, etc.), and alloyed metal or mixture of the metal mentioned above, aluminum, cobalt, copper, lead, magnesium, tin, zinc, antimony, beryllium, bismuth, calcium, cadmium, manganese, selenium, titanium, tungsten and vanadium. The magnetic material preferably has a volume average particle diameter of from about 0.1 to about 2 µm. The content thereof in toner is from 5 to 150 parts by weight based on 100 parts of a binder resin.

Two Component Developing Agent

The toner of the present invention can be used in a two component developing agent using a carrier. Any known carrier can be used. Specific examples thereof include, but are not limited to, iron powder, ferrite, magnetite and glass beads. Also such material can be coated by a resin. Specific examples of such a resin include, but are not limited to, known resins such as polyfluorocarbon, polyvinyl chloride, polyvinylidene chloride, phenol resins, polyvinyl acetal, acryl resins, silicon resins. Silicone coated carriers are excellent in terms of the work life of a developing agent. Optionally, electroconductive, etc. can be contained in a coating resin. Specific examples of such electroconductive powder include, but are not limited to, metal powder, carbon black, titanium dioxide, tin oxide and zinc oxide. Such electroconductive powder preferably has an average particle diameter not greater than 1 µm. When the average particle diameter is too large, it is difficult to control electric resistance. The mixing ratio of toner and carrier in a two component developing agent is from 0.5 to 20.0 parts by weight of the toner based on 100 parts by weight of the carrier.

Method of Manufacturing Toner

The toner of the present invention can be manufactured by any known method which has a process of mechanically mixing at least a binder resin and a coloring agent as toner component, a process of melting and kneading the mixture, a process of pulverizing the resultant, a process of classifying the resultant powder, and an optional process of recycling powder which is not used as a product obtained in the processes of the pulverization and classification.

The powder (by-product) which is not used as a product represents particulates or coarse particles which do not have a desired particle diameter as a product obtained in the pulverization process or the classification process after melting and kneading process. Such by-product is preferably mixed with main material which does not include by-product in the mixing process or the melting and kneading process with the ratio of from 1 to 20 parts by weight of the by-product based on 100 parts by weight of the main material.

A toner component of at least binder resin and a coloring agent with an optional by-product can be mechanically mixed under normal condition by a typical mixer having a rotation wing. There is no specific limit to the conditions of the mixing process.

Subsequent to the mixing process, the mixture obtained is placed in a kneading machine for melting and kneading. As the kneading machine, a one roll or two roll continuous kneading machine and a batch kneading machine using a roll mill can be preferably used, for example, a KTK type two roll extruder manufactured by Kobe Steel Ltd., a TEM type extruder manufactured by Toshiba Machine Co., Ltd., a two roll extruder manufactured by Asada Iron Works Co., Ltd, a PCM type two roll extruder manufactured by Ikegai Ltd, and a Cokneader manufactured by Buss Co., Ltd. It is desired to perform this fusion and kneading in a suitable condition in which molecular chains of a binder resin are not severed. To be specific, the fusion and kneading are performed at a temperature with reference to the softening point of a binder resin. When the temperature is too low relative to the softening point, molecular chains are severely severed. When the temperature is too high, the dispersion does not proceed well.

After completing the melting and kneading process, the kneaded matters obtained are pulverized. In the pulverizing process, the kneaded matters are preferably coarsely pulverized and then finely pulverized. Preferred methods of pulverizing particles of the kneaded matters are, for example, colliding the particles with a collision board in the jet air, colliding the particles with each other and pulverizing the particles at a small gap between a rotor mechanically rotating and a stator.

After the pulverizing process is complete, the obtained pulverized matters are classified in the air by centrifugal force, etc., to obtain a developing agent having a desired particle diameter, for example, 5 to 20 µm.

In addition, when preparing a toner, the external additive of the present invention is admixed with the thus manufactured mother toner to improve fluidity, preservability, developability and transferability of the toner. Optionally, inorganic particulates such as the hydrophobic silica fine powder mentioned above can be admixed as other external additives.

In the process of mixing the external additive, a conventional powder mixer is used. It is preferable that the powder mixer be equipped with a jacket and the like to adjust the internal temperatures thereof. In order to change history of the stresses on the external additive, the external additive may be added in separate times or step by step.

It is also possible to change stress by varying the number of rotation, tumbling speed, and mixing time and temperature. For example, a method in which a strong stress is first applied and then a relatively weak stress is applied, or vice versa can be used. Specific preferred examples of mixing facilities include v-type mixers, rocking mixers, Loedige Mixers, Nauta mixers and HENSCEL mixers.

Image Forming Method

Next, the image formation method of the present invention is described below.

The image formation method using the toner of the present invention includes at least a development process to develop a latent electrostatic image, preferably a process of forming a latent electrostatic image, a transfer process and a fixing process, and more preferably a cleaning process. Other processes such as a discharging process, a recycling process, and a control process can be contained, if desired.

The image forming method of the present invention can be performed by the image forming apparatus of the present invention described later.

The image forming apparatus includes at least a latent electrostatic image bearing member, a latent electrostatic image forming device, a developing device, a transfer device, and a fixing device preferably with a cleaning device. In addition, other devices, such as a discharging device, a recycling device, and a control device can be included, if desired.

The latent electrostatic image formation process can be performed by the latent electrostatic image forming device. The developing process can be performed by the developing device. The transfer process can be performed by the transfer device and the fixing process can be performed by the fixing device. The other processes can be performed by the other respective devices.

Latent Electrostatic Image Forming Process and Latent Electrostatic Image Forming Device The latent electrostatic image formation process is a process of forming a latent electrostatic image on a latent electrostatic image bearing member.

There is no specific limit to the latent electrostatic image bearing member (i.e., photoreceptor) with regard to its material, form, structure, size, etc. Any known photoreceptor can be selected. Among these, a photoreceptor having a drum form is preferred. In terms of the material, it is preferred to use an inorganic photoreceptor of, for example, amorphous silicon or selenium, and an organic photoreceptor of, for example, polysilane and phthalopolymethine. Among these, amorphous silicon is preferred because of its long working life.

A latent electrostatic image is formed by, for example, uniformly charging the surface of the latent electrostatic image bearing member and thereafter irradiating the surface with light according to image information, which is performed by the latent electrostatic image forming device.

The latent electrostatic image forming device is formed of at least, a charging device to uniformly charge the surface of the latent electrostatic image bearing member and an irradiation device to irradiate the surface of the latent electrostatic image bearing member according to image information.

Charging is performed by applying a potential to the surface of the latent electrostatic image bearing member using the charging device.

There is no specific limit to the charging device and any charging device can be suitably selected. For example, there are a contact type charging device having an electroconductive or semi-conductive roll, brush, film or rubber blade and a non-contact type charging device such as a corotron or scorotron using corona discharging.

Irradiation is performed by the irradiating device which irradiates the surface of the latent electrostatic image bearing member with light according to image information.

There is no specific limit to the irradiating device as long as it can irradiate the surface of the charged latent electrostatic image bearing member with light according to image information and any irradiating device can be selected. For example, photocopier optical system, rod lens array system, laser optical system and liquid crystal shutter optical system can be specified.

In the present invention, it is possible to adopt an optical rear irradiation system in which an electrostatic image bearing member is irradiated with light according to image information from the rear side of the electrostatic image bearing member.

Developing Process and Developing Device

The developing process is a process in which the latent electrostatic image is developed with the toner of the present invention to obtain a visualized image.

The visualized image is formed by developing the latent electrostatic image with the toner of the present invention by the developing device mentioned above.

There is no specific limit to the developing device as long as the toner of the present invention can be used for development and any known developing device can be selected. For example, it is suitable to use a developing device including at least a development unit which accommodates the toner of the present invention and provides the toner with the latent electrostatic image in a contact or non-contact manner.

The development unit can employ a dry development system or a wet development system and can be a monochrome development unit or a multiple color development unit. For example, it is suitable to use a development unit having a stirrer which stirs and triboelectrically charges toner and a rotatable magnet roller.

In the development unit, the toner of the present invention and a carrier are mixed and stirred, which triboelectrically charges the toner. The carrier and the toner are held on the surface of a magnet roller in rotation while forming filament, i.e., magnet brush. Since the magnet roller is provided in the vicinity of the latent electrostatic image bearing member, part of the toner forming the magnet brush on the surface of the magnet roller is attracted to the surface of the latent electrostatic image bearing member by electric suction force. As a result, the latent electrostatic image is developed by the toner and an image visualized thereby appears on the surface of the latent electrostatic image bearing member.

The developing agent accommodated in the development unit contains the toner of the present invention and can be a single component developing agent or a two component developing agent.

Transfer Process and Transfer Device

The transfer process is a process in which the visualized image is transferred to a recording medium directly or via an intermediate transfer body, which depends on monochrome printing or color printing.

In the case of color printing, it is preferred that the visualized image is primarily transferred to the intermediate transfer body and then secondarily transferred to the recording medium. It is more preferred that, using two color toner and preferably full color toner, the transfer process includes a primary transfer process in which visualized images are transferred to an intermediate transfer body to form a complex transfer image and a secondary transfer process in which the complex transfer image is transferred to a recording medium.

The visualized image is transferred by the transfer device by charging the latent electrostatic image bearing member by a transfer charging device. It is preferred that the transfer device includes a primary transfer device to form a complex transfer image by transferring visualized images to an intermediate transfer body and a secondary transfer device to transfer the complex transfer image to a recording medium. There is no specific limit to the intermediate transfer body and any intermediate transfer body can be selected. For example, a transfer belt is suitably used for color printing.

The transfer device (the primary transfer device and the secondary transfer device) preferably has at least a transfer unit to charge and detach the visualized image formed on the latent electrostatic image bearing member to the recording medium side. The number of the transfer device can be one or two.

A corona transfer device by corona discharging, a transfer belt, a transfer roller, a pressure transfer roller, an adhesive transfer unit are used as the transfer unit mentioned above.

There is no specific limit to the recording medium and any known recording medium (sheet) can be suitably selected.

Fixing Process and Fixing Device

The fixing process is a process in which the transferred visualized image to the recording medium is fixed by the fixing device. It is possible to fix the visualized image every time the visualized image for each color is transferred or at one time after each color image has been overlapped each other.

There is no specific limit to the fixing device. It is suitable to employ a known heating and pressure device. As such a heating and pressure device, for example, there are a combination of a heating roller and a pressure roller and a combination of a heating roller, a pressure roller and an endless belt.

The heating temperature by the heating and pressure device is preferably from 80 to 200° C.

Furthermore, in the present invention, any known fixing unit can be used instead of or in combination with the fixing process and the fixing device mentioned above.

The discharging process is a process in which a discharging bias is applied to discharge the latent electrostatic image bearing member by a discharging device.

There is no specific limit to the discharging device as long as a discharging bias can be applied to the latent electrostatic image bearing member and any known discharging device can be suitably selected. For example, a discharging lamp can be preferably used.

The cleaning process is a process in which the toner remaining on the latent electrostatic image bearing member is removed by a cleaning device.

There is no specific limit to the cleaning device as along as the cleaning device can remove the toner remaining on the latent electrostatic image bearing member and any known cleaning device can be selected. For example, a magnetic brush cleaner, an electrostatic brush cleaner, a magnetic roller cleaner, a blade cleaner, a brush cleaner and a web cleaner can be preferably used.

The recycle process is a process in which the toner removed in the cleaning process is returned to the development device for reuse by a recycle device.

There is no specific limit to the recycle device and any known transfer device can be used.

The control process is a process of controlling each process mentioned above by a control device.

There is no specific limit to such a control device and any known control device can be used. For example, a device such as a sequencer or a computer can be suitably used.

Having generally described preferred embodiments of this invention, further understanding can be obtained by reference to certain specific examples which are provided herein for the purpose of illustration only and are not intended to be limiting. In the descriptions in the following examples, the numbers represented in parts or % are based on weight, unless otherwise specified.

EXAMPLE

Example 1

Recipe of Toner Particle

| | |
|---|---|
| Polyester resin (Mn: about 4,300, Mw: about 12,700 (glass transition temperature Tg: 55° C.) | 100 parts |
| Carbon black (MA 100, manufactured by Mitsubishi Chemical Corporation) | 3 parts |
| Charge control agent (BONTRON E-84, manufactured by Orient Chemical Industries, Inc.) | 1 part |
| Carnauba wax | 3 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 1

40 g of a marketed product of trifluoropropyl trimethoxy silane (Z-6333 CAS NO. 429-60-7, manufactured by the Dow Chemical Company) is dissolved in 200 g of ethanol solvent.

Next, a market product (MT150, manufactured by Tayca Corporation) of titanium dioxide having a water soluble component in an amount of 0.31% by weight is dispersed in toluene solvent such that the solid portion density is 37%. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g is weighed.

Furthermore, silane solution is mixed with the toluene solvent in which the titanium dioxide is dispersed and the mixture is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 223 g of sample surface reformed titanium dioxide is collected and the attachment amount of trifluoromethoxy silane is 2.0% by weight based on the surface reformed titanium dioxide.

Mixing Process of External Additive 2 parts of a marketed product of silicon dioxide (R972, manufactured by Evonik Industries) and 2 parts of titanium dioxide prepared in Synthesis Example 1 are mixed with 100 parts of the classified toner obtained in Example 1 at a high speed by a HENSCEL MIXER. Thus, a toner composition of Example 1 is obtained.

Example 2

Recipe of Toner Particle

| | |
|---|---|
| Polyester resin (Mn: about 6,100, Mw: about 202,500, glass transition temperature Tg: 65° C.) | 100 parts |
| Cyan dye (Linol blue FG-7350, manufactured by Toyo Ink Mfg. Co., Ltd.) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain blue (cyan) toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 2 parts of titanium dioxide prepared in Synthesis Example 1 are mixed with 100 parts of the classified cyan toner obtained in Example 2 at a high speed by a HENSCEL MIXER. Thus, a toner composition of Example 2 is obtained.

Example 3

Recipe of Toner Particle

| | |
|---|---|
| Polyester resin (Mn: about 6,100, Mw: about 202,500, glass transition temperature Tg: 65° C.) | 100 parts |
| Quinacridone based magenta (C.I. Pigment Red 122) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain magenta toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 2 parts of titanium dioxide prepared in Synthesis Example 1 are mixed with 100 parts of the classified cyan toner obtained in Example 2 at a high speed by a HENSCEL MIXER. Thus, a toner composition of Example 3 is obtained.

Example 4

Recipe of Toner Particle

| | |
|---|---|
| Polyester resin (Mn: about 4,300, Mw: about 12,700, glass transition temperature Tg: 55° C.) | 100 parts |
| Carbon black (MA 100, manufactured by Mitsubishi Chemical Corporation) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 2

40 g of a marketed product of an adduct of perfluoroalkyl ethyleneoxide (F446, manufactured by DIC Corporation)) is dissolved in 200 g of ethanol solvent.

Next, a market product (MT150, manufactured by Tayca Corporation) of titanium dioxide having a water soluble component in an amount of 0.35% by weight is dispersed in toluene solvent such that the solid portion density is 37%. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g is weighed.

Furthermore, silane solution is mixed with the toluene solvent in which the titanium dioxide is dispersed and the mixture is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 223 g of sample surface reformed titanium dioxide is collected and the attachment amount of fluorine is 1.2% by weight based on the surface reformed titanium dioxide.

Mixing Process of External Additive 2 parts of a marketed product of silicon dioxide (R972, manufactured by Evonik Industries) and 2 parts of titanium dioxide prepared in Synthesis Example 2 are mixed with 100 parts of the classified toner obtained in Example 4 at a high speed by a HENSCEL MIXER. Thus, a toner composition of Example 4 is obtained.

Example 5

The mixture prepared in Example 2 is mixed and kneaded by an extruder, pulverized by a jet mill and classified by an air classifier to obtain blue (cyan) toner particles having an average particle diameter (D50) of 8 μm with a particle size distribution of from 4 to 20 μm. 2 parts of a marketed product of silicon dioxide (R972, manufactured by Evonik Industries) and 2 parts of titanium dioxide prepared in Synthesis Example 2 are mixed with 100 parts of the classified cyan toner at a high speed by a HENSCEL MIXER. Thus, a toner composition of Example 5 is obtained.

Example 6

Recipe of Toner Particle

| | |
|---|---|
| Polyester resin (Mn: about 4,300, Mw: about 12,700 (glass transition temperature Tg: 55° C.) | 100 parts |
| Carbon black (MA 100, manufactured by Mitsubishi Chemical Corporation) | 3 parts |
| Charge control agent (BONTRON E-84, manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 3

40 g of a marketed product (Z-6333, manufactured by Toray Industries, Inc.) of trifluoropropyl trimethoxy silane and a market product (Z-6366, manufactured by Toray Industries, Inc.) of methyltrimethoxy silane in equivalence ratio is dissolved in 200 g of methanol solvent.

Next, a market product (MT150, manufactured by Tayca Corporation) of titanium dioxide having a water soluble component in an amount of 0.41% by weight is dispersed in toluene solvent such that the solid portion density is 37%. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g is weighed.

Furthermore, silane solution is mixed with the toluene solvent in which the titanium dioxide is dispersed and the mixture is transferred to a flask placed in an oil bath. The mixture is heated to 60° C. for reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the amount of the solvent of the prescribed amount, the temperature is set to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced by silanol reaction has disappeared. Baking is complete when the amount of the solvent for gas chromatography, especially the amount of methanol, is 190 ppm or below. 221 g of sample surface reformed titanium dioxide is collected and the attachment amount of trifluoromethoxy silane is 2.0% by weight based on the surface reformed titanium dioxide.

Mixing Process of External Additive 2 parts of a marketed product of silicon dioxide (R972, manufactured by Evonik Industries) and 4 parts of titanium dioxide prepared in Synthesis Example 3 are mixed with 100 parts of the classified toner obtained in Example 6 at a high speed by a HENSCEL MIXER. Thus, a toner composition of Example 6 is obtained.

Recipe of Toner Particle

| | |
|---|---|
| Polyester resin (Mn: about 6,100, Mw: about 202,500, glass transition temperature Tg: 65° C.) | 100 parts |
| Yellow (C.I. Pigment Yellow 180) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain yellow toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 3 parts of titanium dioxide prepared in Synthesis Example 3 are mixed with 100 parts of the thus obtained classified toner at a high speed by a HENSCEL MIXER. Thus, toner composition of Example 7 is obtained.

Example 8

2 parts of a marketed product of silicon dioxide (R972, manufactured by Evonik Industries) and 3 parts of titanium dioxide prepared in Synthesis Example 3 are mixed with 100 parts of the classified toner obtained in Example 1 at a high speed by a HENSCEL MIXER. Thus, a black toner composition of Example 86 is obtained.

Example 9

Recipe of Toner Particle

| | |
|---|---|
| Polyester resin (Mn: about 4,300, Mw: about 12,700 (glass transition temperature Tg: 55° C.) | 100 parts |
| Carbon black (MA 100, manufactured by Mitsubishi Chemical Corporation) | 3 parts |
| Charge control agent (BONTRON E-84, manufactured by Orient Chemical Industries, Inc.) | 1 part |
| Carnauba wax | 3 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 4

Titanium tetrachloride as a material in the manufacturing method of a marketed product (TT0-51N, manufactured by Ishihara Sangyo Kaisha Ltd.) is subject to hydrolysis treatment with sodium hydroxide followed by baking. Subsequent to surface treatment with zinc chloride aqueous solution, the resultant is subject to washing, drying and pulverization to obtain titanium dioxide. The obtained surface treated titanium dioxide is measured by ion-chromatography method of IC-7000P (manufactured by Yokogawa Electric Corporation) as follows: for cation: Column ICS-C-15 and Pre-Column ICS-C16 at 40° C. for column; Sample amount: 50 μl; Solvent: $HNO_3$ (5 mM); Removal liquid: Sodium hydroxide having the same density; for anion: Column ICS-A23 and Pre-Column ICS-A26 at 40° C. for column; Sample amount: 50 μl; Solvent: $Na_2CO_3$ (2.5 mM)/$NaHNO_3$ (1.2 mM); Removal liquid: sulfuric acid 15 mM; Flow rate: 1.0 ml/min. (ion chromatography analysis value: zinc ion: 55 μg; chlorine ion: 16 μg; sulfuric acid ion: 102.11 μg; sodium ion: 32.25 μg; $NH_4$ ion: 14.50 μg; $NO_3$ ion: 9.75 μg; water soluble component: 0.21 wt %). This titanium dioxide is dispersed in toluene-methanol solvent (7:1) such that the solid portion thereof is 37%. 40 g of a marketed product of trifluoropropyl trimethoxy silane (Z-6333 CAS NO. 429-60-7, manufactured by the Dow Chemical Company) is added to the resultant. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g of the obtained liquid dispersion is weighed.

The liquid dispersion is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 223 g of sample surface reformed titanium dioxide is collected and the attachment amount of trifluoromethoxy silane is 2.0% by weight based on the surface reformed titanium dioxide.

Mixing Process of External Additive 2 parts of a marketed product of silicon dioxide (R972, manufactured by Evonik Industries) and 2 parts of the surface reformed titanium dioxide prepared in Synthesis Example 4 are mixed with 100 parts of the classified toner obtained in Example 9 at a high speed by a HENSCEL MIXER. Thus, a toner composition of Example 9 is obtained.

Example 10

Recipe of Toner Particle

| | |
|---|---|
| Polyester resin (Mn: about 6,100, Mw: about 202,500, glass transition temperature Tg: 65° C.) | 100 parts |
| Cyan dye (Linol blue FG-7350, manufactured by Toyo Ink Mfg. Co., Ltd.) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain blue (cyan) toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 2 parts of surface reformed titanium dioxide prepared in Synthesis Example 4 are mixed with 100 parts of the classified cyan toner obtained in Example 10 at a high speed by a HENSCEL MIXER. Thus, a toner composition of Example 10 is obtained.

Example 11

Recipe of Toner Particle

| | |
|---|---|
| Polyester resin (Mn: about 6,100, Mw: about 202,500, glass transition temperature Tg: 65° C.) | 100 parts |
| Quinacridone based magenta (C.I. Pigment Red 122) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain magenta toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 2 parts of surface reformed titanium dioxide prepared in Synthesis Example 4 are mixed with 100 parts of the classified magenta toner obtained in Example 11 at a high speed by a HENSCEL MIXER. Thus, a toner composition of Example 11 is obtained.

Example 12

Recipe of Toner Particle

| | |
|---|---|
| Polyester resin (Mn: about 4,300, Mw: about 12,700, glass transition temperature Tg: 55° C.) | 100 parts |
| Carbon black (MA 100, manufactured by Mitsubishi Chemical Corporation) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 5

Titanium tetrachloride as a material in the manufacturing method of a sample product (MPT881, manufactured by Ishihara Sangyo Kaisha Ltd.) is subject to hydrolysis treatment with sodium hydroxide followed by baking. Subsequent to surface treatment with zinc chloride aqueous solution, the resultant is subject to washing, drying and pulverization to surface treated obtain titanium dioxide having a water-soluble component of 0.37 wt %.

The obtained surface treated titanium dioxide is measured by ion-chromatography method of IC-7000P (manufactured by Yokogawa Electric Corporation) as follows: for cation: Column ICS-C-15 and Pre-Column ICS-C16 at 40° C. for column; Sample amount: 50 μl; Solvent: $HNO_3$ (5 mM); Removal liquid: Sodium hydroxide having the same density; for anion: Column ICS-A23 and Pre-Column ICS-A26 at 40° C. for column; Sample amount: 50 μl; Solvent: $Na_2CO_3$ (2.5 mM)/$NaHNO_3$ (1.2 mM); Removal liquid: sulfuric acid 15 mM; Flow rate: 1.0 ml/min. (ion chromatography analysis value: zinc ion: 83.25 μg; chlorine ion: 11.23 μg; sulfuric acid ion: 54.25 μg; sodium ion: 10.25 μg; $NH_4$ ion: 25.75 μg; $NO_3$ ion: 9.75 μg). This titanium dioxide is dispersed in toluene-methanol solvent (7:1) such that the solid portion thereof is 37%. 40 g of a marketed product of an adduct of perfluoroalkyl ethyleneoxide (F446, manufactured by DIC Corporation) is added to the resultant. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g of the liquid dispersion is weighed.

The liquid dispersion is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 223 g of sample surface reformed titanium dioxide is collected and the attachment amount of fluorine is 1.2% by weight based on the surface reformed titanium dioxide.

Mixing Process of External Additive 2 parts of a marketed product of silicon dioxide (R972, manufactured by Evonik Industries) and 2 parts of surface reformed titanium dioxide prepared in Synthesis Example 5 are mixed with 100 parts of the classified toner obtained in Example 12 at a high speed by a HENSCEL MIXER. Thus, a toner composition of Example 12 is obtained.

Example 13

The mixture prepared in Example 10 is mixed and kneaded by an extruder, pulverized by a jet mill and classified by an air classifier to obtain blue (cyan) toner particles having an average particle diameter (D50) of 8 μm with a particle size distribution of from 4 to 20 μm. 2 parts of a marketed product of silicon dioxide (R972, manufactured by Evonik Industries) and 2 parts of surface treated titanium dioxide prepared in Synthesis Example 5 are mixed with 100 parts of the classified cyan toner at a high speed by a HENSCEL MIXER. Thus, a toner composition of Example 13 is obtained.

Example 14

Recipe of Toner Particle

| | |
|---|---|
| Polyester resin (Mn: about 4,300, Mw: about 12,700, glass transition temperature Tg: 55° C.) | 100 parts |
| Carbon black (MA 100, manufactured by Mitsubishi Chemical Corporation) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain black toner particles having an average particle diameter (D50) of 8 μm with a particle size distribution of from 4 to 20 μm.

Manufacturing of Surface Reformed Titanium Dioxide

Synthesis Example 6

Titanium dioxide of a sample product (MPT881, manufactured by Ishihara Sangyo Kaisha Ltd.) having a water soluble component of 0.35 wt % is dispersed in 15% zinc sulfate aqueous solution such that the titanium dioxide has a solid portion of 30%. The liquid dispersion is filtered and the filtrate is removed. The resultant is washed, dried and pulverized to obtain a surface treated titanium dioxide.

The obtained surface treated titanium dioxide is measured by ion-chromatography method of IC-7000P (manufactured by Yokogawa Electric Corporation) as follows: for cation: Column ICS-C-15 and Pre-Column ICS-C16 at 40° C. for column; Sample amount: 50 μl; Solvent: $HNO_3$ (5 mM); Removal liquid: Sodium hydroxide having the same density; for anion: Column ICS-A23 and Pre-Column ICS-A26 at 40° C. for column; Sample amount: 50 μl; Solvent: $Na_2CO_3$ (2.5 mM)/$NaHNO_3$ (1.2 mM); Removal liquid: sulfuric acid 15 mM; Flow rate: 1.0 ml/min. (ion chromatography analysis value zinc ion: 63.02 μg; chlorine ion: 11.25 μg; sulfuric acid ion: 54.85 μg; sodium ion: 10.25 μg; $NH_4$ ion: 25.75 μg; $NO_3$ ion: 9.75 μg).

Then, the obtained titanium dioxide is dispersed in a solvent mixture of toluene and methanol such that the solid portion thereof is 37%. 40 g of a silane solution formed of a marketed product of trifluoropropyl trimethoxysilane (Z-6333, manufactured by Toray Industries, Inc.) and methyltrimethoxy silane (Z-6366, manufactured by Toray Industries, Inc.) with an equivalence ratio is mixed therewith. The resultant is pulverized by a bead mill (NVM-2 type, manufactured by Imex Co., Ltd.) having a bead diameter of 0.5 mm for about 2 hours to obtain particles having an average particle diameter of 0.047 μm (measured by MICROTRAC UPA-150, manufactured by Nikkiso Co., Ltd.) and thereafter 630 g of the liquid dispersion is weighed.

The liquid dispersion is transferred to a flask placed in an oil bath. The mixture is heated to 60° C. followed by reaction for 6 to 7 hours while stirred by a stirrer at 60 rpm until the temperature thereof is 80° C. Ethanol and toluene are collected via a conductor from the mouth of the flask to calculate the amount of the solvent. The amount of the solvent and the amount of non-reacted silane coupling agent, and the progress of silanol process are determined for a sample measured by gas chromatography.

When the amount reaches 90% by weight of the solvent of the prescribed amount, the temperature is raised to be between 130 to 140° C. and the degree of the temperature rising in the oil bath is checked. When the temperature rising speed is slow, the pressure can be reduced to control the temperature rising speed. When the temperature in the oil bath is over 110° C., the reduced pressure is brought back to normal followed by baking for about 6 hours. Then, the resultant is sampled to confirm that the peak of Rt produced in the silanol reaction has disappeared. Baking is complete when the amount of the solvent of the sample for gas chromatography, especially the amount of methanol, is 180 ppm or below. 221 g of sample surface reformed titanium dioxide is collected and the attachment amount of trifluoromethoxy silane is 2.0% by weight based on the surface reformed titanium dioxide.

Mixing Process of External Additive 2 parts of a marketed product of silicon dioxide (R972, manufactured by Evonik Industries) and 2 parts of the surface reformed titanium dioxide prepared in Synthesis Example 6 are mixed with 100 parts of the classified toner obtained in Example 14 at a high speed by a HENSCEL MIXER. Thus, a toner composition of Example 14 is obtained.

Example 15

Recipe of Toner Particle

| | |
|---|---|
| Polyester resin (Mn: about 6,100, Mw: about 202,500, glass transition temperature Tg: 65° C.) | 100 parts |
| Yellow dye (C.I. Pigment Yellow 180) | 3 parts |
| Charge control agent BONTRON E-84 (manufactured by Orient Chemical Industries, Inc.) | 1 part |
| Mixture of carnauba wax (60%) and rice wax (40%) | 4 parts |

Method of Manufacturing Toner Particle

The mixture of the recipe described above is mixed and kneaded by an extruder, pulverized by a jet mill and classified by an air classifier to obtain yellow toner particles having an average particle diameter (D50) of 8 μm with a particle size distribution of from 4 to 20 μm.

Mixing Process of External Additive 2 parts of a marketed product of silicon dioxide (R972, manufactured by Evonik Industries) and 3 parts of surface reformed titanium dioxide prepared in Synthesis Example 6 are mixed with 100 parts of this classified yellow toner at a high speed by a HENSCEL MIXER. Thus, a toner composition of Example 15 is obtained.

Example 16

2 parts of a marketed product of silicon dioxide (R972, manufactured by Evonik Industries) and 3 parts of surface reformed titanium dioxide prepared in Synthesis Example 6 are mixed with 100 parts of the classified toner for use in Example 1 at a high speed by a HENSCEL MIXER. Thus, a black toner composition of Example 16 is obtained.

Comparative Example 1

Treatment of Titanium Dioxide

Titanium dioxide (MT150A, manufactured by Tayca Corporation) manufactured by a wet method which has a water soluble component in an amount of 0.35% is washed with water to obtain titanium dioxide having a water soluble component of 0.15%. 300 g of the thus obtained titanium dioxide is added to and dispersed in a toluene solution in which 35 g of isobutyl trimethoxysilane is dissolved. The solvent is dried up and finely pulverized by a jet mill followed by high dispersion by a pin mill to obtain a coupling agent treated titanium dioxide (hydrophobic titanium dioxide). The absorbance of the thus obtained titanium dioxide is measured and the transmission factor is 21% at 300 nm and 97% at 600 nm. Thereafter, the water repellency and hydorphoby of the titanium dioxide are measured.

Next, 2 parts of a marketed product of silicon dioxide (R972, manufactured by Evonik Industries) and 3 parts of the obtained titanium dioxide are mixed with 100 parts of the classified toner of Example 1 at a high speed by a HENSCEL MIXER. Thus, a black toner composition of Comparative Example 1 is obtained.

Comparative Example 2

The titanium dioxide mentioned above of Synthesis Example D (methanol and water are used as the reaction solvent) is used as the external additive to the toner particles manufactured in the same manner as in Comparative Example 1. 2 parts of a marketed product of silicon dioxide (R972, manufactured by Evonik Industries) and 3 parts of the surface reformed titanium dioxide prepared in Synthesis Example D are mixed with 100 parts of the classified toner obtained in Comparative Example 1 at a high speed by a HENSCEL MIXER. Thus, a toner composition of Comparative Example 2 is obtained. In addition, water repellency and hydrophby of the titanium dioxide particles of Synthesis Example D for use in Comparative Example 2 are measured.

A sample is prepared according to Synthesis Example E of titanium dioxide (3,3,3-trifuloro propyl trimethoxy silane and a coupling agent having an amino group).

A minute amount of the obtained sample is collected and analyzed by GAS CHROMATOGRAPH GC-14 (manufactured by Shimadzu Corporation). Remaining component of non-reacted material considered to be a silane compound is detected.

Next, 2 parts of a marketed product of silicon dioxide (R972, manufactured by Evonik Industries) and 3 parts of the obtained titanium dioxide are mixed with 100 parts of the classified toner of Comparative Example 1 at a high speed by a HENSCEL MIXER. Thus, a toner composition of Comparative Example 3 is obtained. The water repellency and hydorphoby of the titanium dioxide for use Synthesis Example E in Comparative Example 3 are measured.

Comparative Example 4

According to Synthesis Example in Unexamined Published Japanese Patent Application No. 2004-245948

300 g of titanium dioxide (MT150A, manufactured by Tayca Corporation) manufactured by a wet method which has a water soluble component of 0.35% and a primary particle diameter of 0.015 μm is added to and dispersed in a toluene solution in which 25 g of isobutyl methoxysilane is dissolved. The solvent is dried up and finely pulverized by a jet mill to obtain a coupling agent treated titanium dioxide.

Next, 2 parts of a marketed product of silicon dioxide (R972, manufactured by Evonik Industries) and 3 parts of the obtained titanium dioxide are mixed as the external additive with the classified toner obtained in Comparative Example 1 at a high speed by a HENSCHEL MIXER to obtain toner of Comparative Example 4. In addition, the water repellency and the hydrophoby of the titanium dioxide for use in Comparative Example 4 are measured.

Comparative Example 5

The mixture of the recipe for use in Example 2 is mixed and kneaded by an extruder, pulverized by a jet mill and classified by an air classifier to obtain blue (cyan) toner particles having an average particle diameter (D50) of 8 μm with a particle size distribution of from 4 to 20 μm.

2 parts of a marketed product of silicon dioxide (R972, manufactured by Evonik Industries) and 2 parts of titanium dioxide prepared in Comparative Example 1 are mixed with 100 parts of the classified cyan toner at a high speed by a HENSCEL MIXER. Thus, a toner composition of Comparative Example 5 is obtained.

Comparative Example 6

The mixture of the recipe for use in Example 2 is mixed and kneaded by an extruder, pulverized by a jet mill and classified by an air classifier to obtain blue (cyan) toner particles having an average particle diameter (D50) of 8 μm with a particle size distribution of from 4 to 20 μm.

2 parts of a marketed product of silicon dioxide (R972, manufactured by Evonik Industries) and 2 parts of titanium dioxide prepared in Synthesis Example E are mixed with 100 parts of the classified cyan toner at a high speed by a HENSCEL MIXER. Thus, a toner composition of Comparative Example 6 is obtained.

Evaluation Item

Images produced by a marketed product of a digital color printer (IPSIO Color 8500, manufactured by Ricoh Co., Ltd.) are evaluated with regard to the following items 1 to 3 for the products obtained in Examples and Comparative Examples. Also, the water repellency and hydrophoby of the titanium oxide used as an external additive are measured. With regard to the following item No. 3 (image density) and the following item No. 4 (fine line reproducibility), images are evaluated for Examples 1 to 8 and Comparative Examples 1 to 6 after initial images and 10,000 images are output and for Example 9 to 16 after initial images and 30,000 images are output. LL environment and HH environment in Tables 1 to 4 represent 10° C. and 15% RH and 30° C. and 80% RH, respectively.

1. Chargeability

With regard to chargeability, the amount of charge of toner on the developing roller of the printer is measured by a suction method.

2. Background Fouling

The developing agent on the photoreceptor is transferred to a tape after a white solid image is developed. The image density of the tape and a non-transferred tape is measured by 938 spectrodensitometer (manufactured by X-rite, Incorporated) to see the difference. The smaller the difference, the better the degree of background fouling. The degree of background fouling is ranked as Good, Fair and Poor.

3. Image Density

After a solid image is output on a sheet (6000, manufactured by Ricoh Co., Ltd.), the image density thereof is measured by X-Rite (manufactured by X-Rite Incorporated). Each of 4 colors is measured separately and the average thereof is calculated. The image density is evaluated according to this average as follows:

1.0 to less than 1.4: Bad
1.4 to less than 1.6: Fair
1.6 to less than 1.8: Good
1.8 to less than 2.2: Excellent 4. Fine Line Reproducibility (Abnormal Image)

A fine line image of 600 dpi is output on a sheet (6000, manufactured by Ricoh Co., Ltd.) and the degree of fine line bleed is compared with the sample criteria and ranked as Excellent, Good, Fair, Bad. This is measured for a four color overlapped image.

5. Evaluation Method of Water Repellency of Surface Reformed Titanium Dioxide 0.2 g of sample titanium powder is weighed and 25 ml of deionized water at 20° C. is placed in a 50 ml beaker and settled such that the water surface does not swing. The weighed sample titanium powder is placed on the center of the water surface and the time between when the powder is placed and when the water is clouded is measured. The powder floats for a short while but water immerses powder particles and thus the liquid is clouded over time. The transmission factor of the liquid is measured by a spectrophotometer (manufactured by Shimadzu corporation) at 380 nm 10 minutes after the powder is placed on the water to evaluate the clouded state.

Evaluation Criteria

Transmission factor 10 minutes after the powder is placed is
Less than 60%: Bad
60% to less than 80%: Fair
80% or higher: Good 6. Evaluation Method of Hydrophoby 0.2 g of sample titanium powder is weighed and 50 ml of deionized water is placed in a 250 ml flask. The sample titanium powder is placed therein. While stirred by a stirrer such that the water surface does not swing, methanol is dropped to the flask by a burette. The titration by the amount of methanol is performed until the liquid is clouded as a whole after the surface reformed titanium dioxide is moistened and penetrates from the surface into the liquid. The amount of the methanol in the mixture of the methanol and the water is represented by %.

The evaluation results of Examples and Comparative Examples are shown in Tables 1-1, 1-2, 2-1 and 2-2.

TABLE 1-1

| | Powder of surface reformed titanium dioxide | | | Toner | | |
|---|---|---|---|---|---|---|
| | Water soluble component (%) | Water repellency | Hydrophoby | Chargeability (μC/g) | | Background fouling |
| | | | | LL environment | HH environment | |
| Example 1 | 0.31 | Good | 63 | −23.2 | −21.2 | Good |
| Example 2 | 0.31 | Good | 63 | −22.6 | −21.8 | Good |
| Example 3 | 0.31 | Good | 63 | −23.1 | −21.1 | Good |

TABLE 1-1-continued

| | Powder of surface reformed titanium dioxide | | | Toner | | |
|---|---|---|---|---|---|---|
| | Water soluble component (%) | Water repellency | Hydrophoby | Chargeability (μC/g) | | Background fouling |
| | | | | LL environment | HH environment | |
| Example 4 | 0.35 | Good | 63 | −24.3 | −22.2 | Good |
| Example 5 | 0.35 | Good | 63 | −23.5 | −22.8 | Good |
| Example 6 | 0.41 | Good | 63 | −22.4 | −20.2 | Good |
| Example 7 | 0.41 | Good | 63 | −23.7 | −21.9 | Good |
| Example 8 | 0.41 | Good | 63 | −22.6 | −20.6 | Good |
| Comparative Example 1 | 0.15 | Fair | 81 | −22.1 | −10.2 | Fair |
| Comparative Example 2 | 0.15 | Bad | 15 | −18.2 | −6.8 | Bad |
| Comparative Example 3 | 0.11 | Fair | 68 | −21.6 | −15.5 | Fair |
| Comparative Example 4 | 0.35 | Bad | 62 | −19.7 | −14.8 | Fair |
| Comparative Example 5 | 0.15 | Bad | 81 | −18.5 | −15.2 | Fair |
| Comparative Example 6 | 0.11 | Bad | 60 | −17.1 | −12.8 | Bad |

TABLE 1-2

| | Evaluation of Toner | | | | | | | |
|---|---|---|---|---|---|---|---|---|
| | Image density | | | | Abnormal image (filming) | | | |
| | Initial images | | 10,000th print | | Initial images | | 10,000th print | |
| | LL | HH | LL | HH | LL | HH | LL (filming) | HH |
| Example 1 | Excellent | Excellent | Excellent | Excellent | Excellent | Excellent | No | Excellent |
| Example 2 | Good | Good | Good | Good | Good | Good | No | Good |
| Example 3 | Good | Good | Good | Good | Good | Good | No | Good |
| Example 4 | Excellent | Excellent | Excellent | Excellent | Excellent | Excellent | No | Excellent |
| Example 5 | Good | Good | Good | Good | Good | Good | No | Good |
| Example 6 | Excellent | Excellent | Excellent | Excellent | Excellent | Excellent | No | Excellent |
| Example 7 | Good | Good | Good | Good | Good | Good | No | Good |
| Example 8 | Excellent | Excellent | Excellent | Excellent | Excellent | Excellent | No | Excellent |
| Comparative Example 1 | Excellent | Excellent | Excellent | Excellent | Good | Fair | Slightly Yes | Fair |
| Comparative Example 2 | Good | Bad | Bad | Bad | Good | Bad | Yes | Bad |
| Comparative Example 3 | Excellent | Good | Good | Fair | Good | Bad | Yes | Fair |
| Comparative Example 4 | Excellent | Good | Good | Fair | Good | Bad | Yes | Fair |
| Comparative Example 5 | Good | Fair | Good | Fair | Good | Bad | Yes | Fair |
| Comparative Example 6 | Good | Fair | Good | Bad | Good | Bad | Slightly Yes | Bad |

TABLE 2-1

| | Powder of surface reformed titanium dioxide | | | | Toner | | |
|---|---|---|---|---|---|---|---|
| | Water soluble component (%) | Amount of Zn ion contained (μC/g) | Water repellency | Hydrophoby | Chargeability (μC/g) | | Background fouling |
| | | | | | LL environment | HH environment | |
| Example 9 | 0.21 | 55 | Good | 63 | −23.5 | −22.1 | Good |
| Example 10 | 0.21 | 55 | Good | 63 | −22.7 | −21.8 | Good |

TABLE 2-1-continued

| | Powder of surface reformed titanium dioxide | | | | Toner | | |
|---|---|---|---|---|---|---|---|
| | Water soluble component (%) | Amount of Zn ion contained (μC/g) | Water repellency | Hydrophoby | Chargeability (μC/g) | | Background fouling |
| | | | | | LL environment | HH environment | |
| Example 11 | 0.21 | 55 | Good | 63 | −23.5 | −21.6 | Good |
| Example 12 | 0.37 | 83.25 | Good | 63 | −30.9 | −22.5 | Good |
| Example 13 | 0.37 | 83.25 | Good | 63 | −23.5 | −22.6 | Good |
| Example 14 | 0.35 | 63.02 | Good | 67 | −22.4 | −20.5 | Good |
| Example 15 | 0.35 | 63.02 | Good | 67 | −23.7 | −21.9 | Good |
| Example 16 | 0.35 | 63.02 | Good | 67 | −22.6 | −20.6 | Good |

TABLE 2-2

| | Evaluation of Toner | | | | | | | |
|---|---|---|---|---|---|---|---|---|
| | Image density | | | | Abnormal image (filming) | | | |
| | Initial images | | 30,000th print | | Initial images | | 30,000th print | |
| | LL | HH | LL | HH | LL | HH | LL (filming) | HH |
| Example 9 | Excellent | Excellent | Excellent | Excellent | Excellent | Good | No | Excellent |
| Example 10 | Excellent | Good | Excellent | Excellent | Excellent | Excellent | No | Good |
| Example 11 | Excellent | Excellent | Excellent | Good | Excellent | Excellent | No | Good |
| Example 12 | Excellent | Excellent | Excellent | Excellent | Excellent | Excellent | No | Good |
| Example 13 | Excellent | Excellent | Excellent | Excellent | Excellent | Excellent | No | Excellent |
| Example 14 | Excellent | Excellent | Excellent | Excellent | Excellent | Excellent | No | Good |
| Example 15 | Good | Good | Good | Good | Excellent | Good | No | Excellent |
| Example 16 | Good | Excellent | Excellent | Good | Excellent | Good | No | Good |

As seen in the results shown in Tables 1-1, 1-2, 2-1 and 2-2, the images obtained using the toners of Examples are clear and vivid without background fouling, etc. after initial stage, prints and 30,000 prints. The toner thin layer on the roller is uniform when observed with naked eyes. When the amount of charge on the developing roller is measured by a suction method, black toners (Examples 1, 4, 5, 6, 8, 9, 12, 14, 16) have an amount of charge of -22.5 μC/g, yellow toners (Examples 7 and 15) have an amount of charge of -23 μC/g, magenta toners (Examples 3 and 11) have an amount of charge of −23 μC/g, and cyan toners (Examples 2, 10 and 13) have an amount of charge of −22.2 μC/g. Good images are also produced under a high temperature and high humidity environment (30° C. and 80% RH) and a low temperature and low humidity environment (10° C. and 15% RH). Furthermore, the durability test is performed for 40,000 continuous full color images in total while repeatedly changing the environment from room temperature, the low temperature and low humidity to the high temperature and high humidity. There is no significant change to thus obtained fixed images and the 40,000th image is vivid and clear without background fouling. The toner thin layer on the roller is uniform when observed with naked eyes. With regard to the amount of charge, black toners have an amount of charge of −22.8 μC/g, yellow toners have an amount of charge of −22.5 μC/g, magenta toners have an amount of charge of −21.2 μC/g, and cyan toners have an amount of charge of −20.3 μC/g, which are stable. No filming is observed when the developing roller, the blade and the photoreceptor are observed with naked eyes.

The images obtained at the initial stage using the toner of Comparative Examples are vivid and clear and free from abnormality such as background fouling. When the developing roller is observed with naked eyes after a run length of 10,000, the toner thin layer on the developing roller is uniform. The amount of charge on the developing roller that is measured by a suction method ranges from −18.2 to −14.1 μC/g. The images obtained under a high temperature and high humidity environment (30° C. and 80% RH) have a rough touch. The images formed under a low temperature and low humidity environment (10° C. and 15% RH) has a low density. When the durability test is performed while repeatedly changing the environment from room temperature, the low temperature and low humidity to the high temperature and high humidity, abnormal images with background fouling, dust streaks, etc, are obtained. When the developing roller is observed at this point, a streak is observed on the toner thin layer on the developing roller along the circumference direction. That is, the toner of Comparative Examples are affected by are environmental change and thus the amount of charge easily decays, which leads to occurrence of filming.

This document claims priority and contains subject matter related to Japanese Patent Application No. 2007-236402, filed on Sep. 12, 2007, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An external additive comprising:
   titanium dioxide having a water-soluble component of at least 0.2% by weight; and
   a fluorosilane compound,
   wherein the titanium dioxide is surface-reformed by the fluorosilane compound; and
   wherein a transmission factor of 25 ml of deionized water at 20° C. to which 0.02 g of the external additive is added is at least 80% for light having a wavelength of 380 nm at ten minutes after the external additive is added to the deionized water.

2. The external additive according to claim 1, wherein the titanium dioxide is rutile type titanium dioxide.

3. The external additive according to claim 1, further comprising fluorine in an amount of from 0.1 to 2.3% by weight.

4. The external additive according to claim 1, wherein the titanium dioxide is manufactured and refined from titanium ore by a wet method.

5. The external additive according to claim 1, wherein a particle size in liquid (D50) after surface-reforming ranges from 0.04 to 0.100 μm.

6. A method of manufacturing the external additive according to claim 1, comprising:
   reacting a mixture of a non-polar solvent in which titanium dioxide having a water-soluble component of at least 0.2% by weight is dispersed and an alcohol solvent in which a fluorosilane compound is dissolved; and
   evaporating the non-polar solvent and the alcohol solvent to obtain powder; and
   baking the powder.

7. The method of manufacturing the external additive according to claim 6, wherein the titanium dioxide is rutile type titanium dioxide.

8. The method of manufacturing the external additive according to claim 6, wherein the titanium dioxide is obtained by neutralizing titanium hydroxide.

9. The method of manufacturing the external additive according to claim 6, wherein the titanium dioxide is manufactured and refined from titanium ore by a wet method.

10. The method of manufacturing the external additive according to claim 6, wherein baking is performed after reacting the mixture is complete.

11. The method of manufacturing the external additive according to claim 10, wherein whether reacting the mixture is complete is determined by detecting a non-reacted fluorosilane compound.

12. The method of manufacturing the external additive according to claim 6, wherein the external comprises fluorine ranging from 0.1 to 2.3% by weight.

13. The method of manufacturing the external additive according to claim 6, wherein a particle size in liquid (D50) after reacting a mixture ranges from 0.04 to 0.1 μm.

14. A toner comprising:
    mother toner comprising a coloring agent and a binder resin comprising a thermoplastic resin comprising a polyester resin; and
    the external additive of claim 1 being attached to the mother toner.

15. The toner according to claim 14, wherein the toner is a pulverized toner.

16. The toner according to claim 14, wherein the external additive of claim 1 is attached to the mother toner in an amount ratio of from 0.5 to 1.5% by weight.

* * * * *